(12) United States Patent
Fraccaroli

(10) Patent No.: US 11,765,552 B2
(45) Date of Patent: Sep. 19, 2023

(54) METHOD, SYSTEM AND APPARATUS FOR INTERACTING WITH A DIGITAL WORK

(71) Applicant: Federico Fraccaroli, Irving, TX (US)

(72) Inventor: Federico Fraccaroli, Irving, TX (US)

(*) Notice: Subject to any disclaimer, the term of this patent is extended or adjusted under 35 U.S.C. 154(b) by 100 days.

(21) Appl. No.: 17/532,580

(22) Filed: Nov. 22, 2021

(65) Prior Publication Data
US 2022/0082038 A1 Mar. 17, 2022

Related U.S. Application Data

(63) Continuation of application No. 16/572,555, filed on Sep. 16, 2019, now Pat. No. 11,184,448, which is a (Continued)

(51) Int. Cl.
*H04W 4/02* (2018.01)
*H04W 4/029* (2018.01)
(Continued)

(52) U.S. Cl.
CPC ............ *H04W 4/029* (2018.02); *H04W 4/02* (2013.01); *H04L 67/306* (2013.01); *H04W 4/021* (2013.01)

(58) Field of Classification Search
CPC ........ F01N 3/005; F01N 3/0205; F01N 3/033; F01N 3/035; F01N 3/043; F01N 3/055; F01N 3/2889; F01N 2240/02; F01N 2240/22; F01N 2250/02; F01N 2250/10; F01N 2260/024; F01N 2570/22; B01D 53/002; C02F 1/16; C02F 2201/008; C02F 2201/009; F02B 63/042; F02B 2201/02; H04W 4/029; H04W 4/021; H04W 4/02; H04W 4/80; H04L 67/306; H04L 67/18
See application file for complete search history.

(56) References Cited

U.S. PATENT DOCUMENTS

| 5,086,394 A | 2/1992 | Shapira |
| 5,432,542 A | 7/1995 | Thibadeau |
(Continued)

FOREIGN PATENT DOCUMENTS

| EP | 0717545 A2 | 6/1996 |
| EP | 0795991 A1 | 9/1997 |
(Continued)

OTHER PUBLICATIONS

Jasmine France—TouchTunes creates jukebox remote app for iPhone, Sep. 14, 2010 , C/NET.
(Continued)

*Primary Examiner* — Chuong A Ngo
(74) *Attorney, Agent, or Firm* — Federico Fraccaroli

(57) ABSTRACT

According to one embodiment of the present invention, a method, a system, and an apparatus are presented for mediating ambiance outputs among a plurality of users located in a common area. In some implementations, said ambiance outputs can be adaptive or interactive shared digital works. In other implementations, said ambiance outputs can be shared mediated augmented reality. In other implementations, said ambiance outputs can be the result of hierarchical schemes and algorithms. In another embodiment a method, system, and apparatus is presented for extracting and/or storing previously tagged items from a digital work.

20 Claims, 8 Drawing Sheets

Related U.S. Application Data continuation-in-part of application No. 15/295,880, filed on Oct. 17, 2016, now Pat. No. 10,419,556, which is a continuation-in-part of application No. 14/868,270, filed on Sep. 28, 2015, now Pat. No. 9,473,582, which is a continuation-in-part of application No. 14/564,011, filed on Dec. 8, 2014, now Pat. No. 9,148,484, which is a continuation-in-part of application No. 13/941,541, filed on Jul. 15, 2013, now Pat. No. 8,909,256, which is a continuation of application No. 13/572,617, filed on Aug. 11, 2012, now Pat. No. 8,489,119.

(51) Int. Cl.
  *H04L 67/306* (2022.01)
  *H04W 4/021* (2018.01)

(56) References Cited

U.S. PATENT DOCUMENTS

| | | |
|---|---|---|
| 5,798,785 A | 8/1998 | Hendricks et al. |
| 5,832,381 A | 11/1998 | Kauppi |
| 5,918,181 A | 6/1999 | Foster et al. |
| 5,945,988 A | 8/1999 | Williams et al. |
| 5,963,951 A | 10/1999 | Collins |
| 6,052,122 A | 4/2000 | Sutcliffe et al. |
| 6,061,561 A | 5/2000 | Collins |
| 6,061,681 A | 5/2000 | Collins |
| 6,256,503 B1 | 7/2001 | Stephens |
| 6,438,579 B1 | 8/2002 | Hosken |
| 6,530,083 B1 | 3/2003 | Liebenow |
| 6,539,232 B2 | 3/2003 | Hendrey et al. |
| 6,542,748 B2 | 4/2003 | Hendrey et al. |
| 6,542,750 B2 | 4/2003 | Hendrey et al. |
| 6,549,768 B1 | 4/2003 | Fraccaroli |
| 6,563,430 B1 | 5/2003 | Kemink |
| 6,647,269 B2 | 11/2003 | Hendrey et al. |
| 6,774,840 B1 | 8/2004 | Adamczyk et al. |
| 6,791,467 B1 | 9/2004 | Ben-Ze'ev |
| 7,024,195 B2 | 4/2006 | Miriyala et al. |
| 7,113,797 B2 | 9/2006 | Kelley |
| 7,134,130 B1 | 11/2006 | Thomas |
| 7,203,502 B2 | 4/2007 | Wilson et al. |
| 7,254,388 B2 | 8/2007 | Nam et al. |
| 7,280,822 B2 | 10/2007 | Fraccaroli |
| 7,328,029 B1 | 2/2008 | Adamczyk et al. |
| 7,359,724 B2 | 4/2008 | Torvinen |
| 7,643,834 B2 | 1/2010 | Ioppe et al. |
| 7,668,537 B2 | 2/2010 | De Vries |
| 7,813,741 B2 | 10/2010 | Hendrey et al. |
| 7,822,687 B2 | 10/2010 | Brillon |
| 7,840,224 B2 | 11/2010 | Vengroff et al. |
| 7,848,765 B2 | 12/2010 | Phillips et al. |
| 7,856,360 B2 | 12/2010 | Kramer et al. |
| 7,881,733 B2 | 2/2011 | Amidon et al. |
| 7,925,723 B1 | 4/2011 | Amidon et al. |
| 7,953,548 B2 | 5/2011 | Vengroff |
| 7,970,390 B2 | 6/2011 | Fraccaroli |
| 8,019,692 B2 | 9/2011 | Rosen |
| 8,046,411 B2 | 10/2011 | Hayashi et al. |
| 8,069,076 B2 | 11/2011 | Oddo |
| 8,104,066 B2 | 1/2012 | Colsey et al. |
| 8,126,479 B2 | 2/2012 | Morrison |
| 8,126,480 B2 | 2/2012 | Morrison |
| 8,135,505 B2 | 3/2012 | Vengroff et al. |
| 8,150,439 B2 | 4/2012 | Vengroff et al. |
| 8,151,304 B2 | 4/2012 | Nathan et al. |
| 8,154,401 B1 | 4/2012 | Bertagna et al. |
| 8,200,248 B2 | 6/2012 | Ioppe et al. |
| 8,244,564 B2 | 8/2012 | Selinger et al. |
| 8,275,361 B2 | 9/2012 | De Vries |
| 8,311,845 B2 | 11/2012 | Vengroff et al. |
| 8,332,895 B2 | 12/2012 | Nathan et al. |
| 8,359,643 B2 | 1/2013 | Low et al. |
| 8,462,997 B2 | 6/2013 | Pettit et al. |
| 8,571,518 B2 | 10/2013 | Imes et al. |
| 8,639,706 B1 | 1/2014 | Bilinski et al. |
| 8,712,218 B1 | 4/2014 | Begeja et al. |
| 8,756,011 B2 | 6/2014 | Vengroff et al. |
| 8,782,533 B2 | 7/2014 | Kravstova |
| 8,805,418 B2 | 8/2014 | Nichols |
| 8,880,101 B2 | 11/2014 | Fraccaroli |
| 8,943,537 B2 | 1/2015 | Hannum et al. |
| 8,949,871 B2 | 2/2015 | Chai et al. |
| 8,996,687 B2 | 3/2015 | Zadig |
| 9,100,454 B2 | 8/2015 | Holden et al. |
| 9,125,169 B2 | 9/2015 | Nichols |
| 9,137,651 B2 | 9/2015 | Agarwal et al. |
| 9,213,230 B1 | 12/2015 | Amidon et al. |
| 9,232,273 B2 | 1/2016 | Amidon et al. |
| 9,338,622 B2 | 5/2016 | Bjontegard |
| 9,419,965 B2 | 8/2016 | Tan |
| 9,423,922 B2 | 8/2016 | Welinder et al. |
| 9,575,967 B2 | 2/2017 | Burgis |
| 9,614,921 B2 | 4/2017 | Vengroff et al. |
| 9,801,024 B2 | 10/2017 | Saleem |
| 9,894,476 B2 | 2/2018 | Fraccaroli |
| 2002/0034954 A1 | 3/2002 | Nohara |
| 2002/0095333 A1* | 7/2002 | Jokinen ............ G06Q 30/0269 705/14.66 |
| 2002/0111173 A1 | 8/2002 | Hendrey et al. |
| 2002/0174428 A1 | 11/2002 | Agnihotri et al. |
| 2002/0194586 A1 | 12/2002 | Gulla et al. |
| 2003/0020623 A1 | 1/2003 | Cao |
| 2003/0126108 A1 | 7/2003 | Martino |
| 2003/0227439 A1 | 12/2003 | Lee et al. |
| 2004/0003392 A1 | 1/2004 | Trajkovic |
| 2004/0023666 A1* | 2/2004 | Moon ................ G06F 16/9537 455/427 |
| 2004/0186768 A1 | 9/2004 | Wakim |
| 2005/0286546 A1 | 12/2005 | Bassoli et al. |
| 2006/0095516 A1 | 5/2006 | Wijeratne |
| 2006/0189878 A1 | 8/2006 | Joshi et al. |
| 2006/0195361 A1 | 8/2006 | Rosenberg |
| 2006/0276174 A1 | 12/2006 | Katz et al. |
| 2007/0010195 A1 | 1/2007 | Brown et al. |
| 2007/0064954 A1 | 3/2007 | Booth |
| 2007/0155307 A1 | 7/2007 | Ng et al. |
| 2007/0244880 A1 | 10/2007 | Martin |
| 2008/0052371 A1 | 2/2008 | Partovi et al. |
| 2008/0065774 A1 | 3/2008 | Keeler |
| 2008/0084983 A1 | 4/2008 | Chen et al. |
| 2008/0086379 A1 | 4/2008 | Dion et al. |
| 2008/0113674 A1 | 5/2008 | Baig |
| 2008/0167016 A1 | 7/2008 | Swanburg et al. |
| 2008/0168807 A1 | 7/2008 | Dion |
| 2008/0181172 A1 | 7/2008 | Angelhag et al. |
| 2008/0187188 A1 | 8/2008 | Beletski et al. |
| 2008/0195664 A1 | 8/2008 | Maharajh et al. |
| 2009/0006180 A1 | 1/2009 | Hameen-Anttila |
| 2009/0049004 A1 | 2/2009 | Nurminen et al. |
| 2009/0077052 A1 | 3/2009 | Farrelly |
| 2009/0125464 A1 | 5/2009 | Shi |
| 2009/0125499 A1 | 5/2009 | Cross et al. |
| 2009/0164516 A1 | 6/2009 | Svendsen et al. |
| 2009/0164574 A1 | 6/2009 | Hoffman |
| 2009/0176520 A1 | 7/2009 | B. S. et al. |
| 2009/0203370 A1 | 8/2009 | Giles et al. |
| 2009/0215469 A1 | 8/2009 | Fisher et al. |
| 2009/0234711 A1 | 9/2009 | Ramer |
| 2009/0239587 A1 | 9/2009 | Negron et al. |
| 2009/0286549 A1 | 11/2009 | Canon et al. |
| 2009/0328087 A1 | 12/2009 | Higgins et al. |
| 2010/0056183 A1 | 3/2010 | Oh |
| 2010/0077017 A1 | 3/2010 | Martinez et al. |
| 2010/0082427 A1 | 4/2010 | Burgener et al. |
| 2010/0082488 A1 | 4/2010 | Evans et al. |
| 2010/0223555 A1 | 9/2010 | Zellner et al. |
| 2010/0229192 A1 | 9/2010 | Marilly et al. |
| 2010/0241968 A1 | 9/2010 | Tarara et al. |
| 2010/0250458 A1 | 9/2010 | Ho |
| 2010/0317396 A1 | 12/2010 | Reynolds et al. |
| 2010/0319052 A1 | 12/2010 | Ferren |

(56) References Cited

U.S. PATENT DOCUMENTS

| | | |
|---|---|---|
| 2011/0016399 A1 | 1/2011 | Yasrebi et al. |
| 2011/0035445 A1 | 2/2011 | Eickhoff |
| 2011/0047471 A1 | 2/2011 | Lord et al. |
| 2011/0066366 A1 | 3/2011 | Ellanti et al. |
| 2011/0066943 A1 | 3/2011 | Brillion |
| 2011/0142016 A1 | 6/2011 | Chatterjee |
| 2011/0179108 A1 | 7/2011 | Sorenson et al. |
| 2011/0225048 A1 | 9/2011 | Nair |
| 2011/0283236 A1 | 11/2011 | Beaumier et al. |
| 2011/0295843 A1 | 12/2011 | Ingrassia, Jr. et al. |
| 2012/0036132 A1 | 2/2012 | Doyle |
| 2012/0064919 A1 | 3/2012 | Prudy |
| 2012/0083286 A1 | 4/2012 | Kim et al. |
| 2012/0158531 A1 | 6/2012 | Dion et al. |
| 2012/0166965 A1 | 6/2012 | Nathan et al. |
| 2012/0209839 A1 | 8/2012 | Andrews et al. |
| 2012/0239761 A1 | 9/2012 | Linner et al. |
| 2013/0012239 A1 | 1/2013 | Crowley et al. |
| 2013/0035114 A1 | 2/2013 | Holden |
| 2013/0053012 A1 | 2/2013 | Dhodapkar |
| 2013/0059606 A1 | 3/2013 | Pujol |
| 2013/0104238 A1 | 4/2013 | Balsan et al. |
| 2013/0122936 A1 | 5/2013 | Hudson |
| 2013/0165168 A1 | 6/2013 | Jintaseranee et al. |
| 2013/0316735 A1 | 11/2013 | Li |
| 2014/0045472 A1 | 2/2014 | Sharma et al. |
| 2014/0095296 A1 | 4/2014 | Angell et al. |
| 2014/0099973 A1 | 4/2014 | Cecchini et al. |
| 2014/0122592 A1 | 5/2014 | Houston et al. |
| 2014/0149219 A1 | 5/2014 | Redfern et al. |
| 2014/0162693 A1 | 6/2014 | Wachter et al. |
| 2014/0162698 A1 | 6/2014 | Han |
| 2014/0171119 A1 | 6/2014 | Fraccaroli |
| 2014/0222561 A1 | 8/2014 | Mathur |
| 2014/0280526 A1 | 9/2014 | Filho |
| 2014/0316897 A1 | 10/2014 | Montanaro |
| 2015/0310492 A1 | 10/2015 | Zewin |
| 2016/0337827 A1 | 11/2016 | Bjontegard |
| 2018/0176728 A1 | 6/2018 | Fraccaroli |

FOREIGN PATENT DOCUMENTS

| | | |
|---|---|---|
| EP | 0699330 B1 | 4/1998 |
| EP | 1434459 | 6/2004 |
| EP | 2259237 A1 | 12/2010 |
| WO | WO97/16934 | 5/1997 |
| WO | WO9821913 | 5/1998 |
| WO | WO9911078 | 3/1999 |
| WO | WO0011793 | 3/2000 |
| WO | WO0019344 | 4/2000 |
| WO | WO0030379 | 5/2000 |

OTHER PUBLICATIONS

Marcus Webb—Downloading Changes The Art of Music Category Management, Jun. 16, 2006, Vending Times.

Adrian Covert—Cellphone-controlled Jukeboxes bring New Meaning to Drunk Dialing, Apr. 14, 2008, Gizmodo.

Connecting with others has never been easier—Qualcomm CDMA Technologies, Oct. 22, 2007.

GpsOne for Entertainment—Qualcomm CDMA Technologies, Oct. 22, 2007.

Jessica E. Vascellaro—Mobile dating, The wall street journal, Jun. 8, 2007.

Nathan Eagle, Alex Pentland—Mobile matchmaking: proximity Sensing and Cueing, MIT Media Laboratory Technical Note 580, May 2004.

TouchTunes Mobile Application Operator FAQ Version 1.3, Feb. 2011.

Replay Magazine, Music Innovation, Jul. 2011, p. 57.

Daniel Olguin Olguin, Alex Pentland, Social Sensors for Automatic Data Collection, AMCIA 2008 Proceedings, Aug. 14-17, 2008.

\* cited by examiner

User Set of Parameters: 300

| Ambiance Classes 310 | Classes Preferences 320 | General User Data 330 | General User Preferences 340 |
|---|---|---|---|
| Music — 311 | Genres<br>•Alternative country<br>•Jazz<br>Specific Songs<br>My Way (Sinatra)<br>Specific Singers: Sinatra<br>User library & preferred playlist i.e. retrieved over the network and stored on cloud or on Service Server 100. | • User Tier: (1,2,3) — 331<br>• User popularity index — 332<br>• User Persistence within area — 333<br>• Paying User: Y/N — 334<br>• Analytics User's Profile (generated by analyzing user's activity.) — 335<br>• Inferred User Profile (generated by analyzing similar users' profiles and choices.) — 336<br>• Credit card number — 337<br>• Date of Birth — 338<br>• Gender: M/F — 339<br>• Tagged Items — 380 | Exclusions — 342<br>• Latin<br>• Classical — 341 |
| Light Ambiance — 312 | Soft lights | | |
| Ceiling Fan — 313 | Medium speed | | |
| TV Channels — 314 | ESPN, CNN | | |
| Movies or Mixed Digital Content<br>Recurrence 315  319 | User library<br>(Retrieved over the network from personal computer) | | Exclusions<br>• Kids programs<br>• Cartoons<br>Romance (1-10): 3<br>Action (1-10): 5<br>Adventure (1-10): 7<br>Thriller (1-10): 3<br>Sexual explicitness (1-10): 5<br>Comedy (1-10) : 2 — 343 |
| Games — 316 | Preference<br>Level: advanced<br>No advertisement | | |
| Augmented reality — 317<br>•Shared — 318<br>•Personal | Priority — 321<br>Traffic lights: priority 1 | | |

FIGURE 3

Operator Set of Parameters 600

| Ambiance Classes 610 | Classes Preferences 620 | Operator Data 630 | General Operator Preferences 640 |
|---|---|---|---|
| Music | Genres<br>•Alternative country<br>•Jazz<br>Specific Songs<br>My Way (Sinatra)<br>Specific Singers: Sinatra<br>Library & preferred playlist<br>i.e. retrieved over the network and stored on cloud or on Service Server 100. | • Preferred Users / User Tier: (1,2,3) —631<br>• User popularity index<br>• User Persistence within area<br>• Paying User: Y/N<br>• Analytics User's Profile (generated by analyzing user's activity.)<br>• Inferred User Profile (generated by analyzing similar users' profiles and choices.)<br>• Credit card number<br>• Date of Birth —632<br>• Gender: M/F —633<br>• Timers —621 | Exclusions<br>• Latin<br>• Classical |
| Light Ambiance | Soft lights | | |
| Ceiling Fan | Medium speed | | |
| TV Channels | Channels<br>ESPN, CNN | | Exclusions<br>• Kids programs<br>• Cartoons |
| Movies or Mixed Digital Content | Library<br>(Retrieved over the network from personal computer) | | Romance (1-10): 3<br>Action (1-10): 5<br>Adventure (1-10): 7<br>Thriller (1-10): 3<br>Sexual explicitness (1-10): 5 } 643<br>Comedy (1-10) : 2<br>Content Rating (Classification and Rating Administration) } 644 |
| Games | Preference<br>Level: advanced<br>No advertisement | | |
| Augmented reality<br>•Shared<br>•Personal | Priority 641<br>Traffic lights: priority 1 | | |

FIGURE 6

METHOD, SYSTEM AND APPARATUS FOR INTERACTING WITH A DIGITAL WORK

PRIORITY CLAIM

This application is a continuation in part of and claims the benefit of, co-pending U.S. patent application Ser. No. 15/295,880 filed on Oct. 17, 2016 titled Method, System, and Apparatus for Interacting with a Digital Work That Is Performed in a Predetermined Location. Said U.S. patent application is a continuation in part of Ser. No. 14/868,270 filed on Sep. 28, 2015 now U.S. Pat. No. 9,473,582 titled Method, System, and Apparatus for Providing a Mediated Sensory Experience to Users Positioned in a Shared Location. Said U.S. patent application is a continuation in part of Ser. No. 14/564,011, filed Dec. 8, 2014 titled "Method, System, and Apparatus for Providing a Mediated Sensory Experience to Users Positioned in a Shared Location", now U.S. Pat. No. 9,148,484. Said U.S. patent application is a continuation in part of Ser. No. 13/941,541, filed Jul. 15, 2013 titled "Method and Apparatus for Mediating Among a Plurality of Profiles Associated with Users Positioned in a Shared Location," now U.S. Pat. No. 8,909,256. Said U.S. Pat. No. 8,909,256 is a continuation of Ser. No. 13/572,617, filed Aug. 11, 2012 titled "Method and Apparatus for Mediating Among a Plurality of Profiles Associated with Users Positioned in a Shared Location," now U.S. Pat. No. 8,489,119. All the above-mentioned patents and applications are incorporated by reference.

TECHNICAL FIELD

The present application relates generally to a method, a system, and an apparatus to mediate 1) between a plurality of user datagrams containing data profiles, settings, and preferences associated with different users who are positioned within a shared location area or 2) between direct inputs, preferences, or priorities among said users who are positioned within a shared location area or 3) to interact with a digital work that is performed in a predetermined location.

BACKGROUND

As an example of how public places managed shared entertainment, jukeboxes came into use in the United States around 1940. These machines were installed in taverns. For a fee, patrons could pick their favorite songs from a limited selection of songs available. Song popularity counters told the owner of the machine the number of times each record was played, with the result that popular records remained, while lesser-played songs could be replaced. Nowadays jukeboxes have almost disappeared in the wake of digital technology and miniaturization.

There are many scenarios in which a plurality of people congregate and may spend some time together; sometimes the settings are public places like a restaurant, a movie theater or a bar. Some other times the settings are more private: a private house, a conference, a classroom or a party. Usually, in all of these scenarios customers, guests and passersby collectively enjoy, (or alternatively put up with) the digital content or settings that are provided by the owner, the operator of the premises or choices and preferences that are set in stone either by the artist or, e.g., a movie editor.

For example, in a bar, the operator selects the music, the TV channels, the temperature, the ambiance, and other settings. Those choices and preferences set the tone of the public place by attracting certain kind of customers while deterring others. This is also true in private houses. For example, one of the members of a family at home interacts with a thermostat and sets the temperature on behalf of everybody.

The progress in miniaturization of electronics, improved batteries, and computing capability has made it possible for the creation of portable devices that have the capability of delivering different kinds of digital media content to users. Usually these portable devices interface with a software program that resides on computers; this software is capable of managing the digital content and the preferences that a particular user may have. For example, iTunes is a digital content manager application that allows a user to buy and manage audio and video on a personal computer. Many alternatives to iTunes do exist for managing digital content. Users can organize their music into playlists within one or more libraries, edit file information, record Compact Discs, copy files to a digital audio player, purchase music and videos through a built-in music store, download free podcasts, back up songs, run a visualizer to display graphical effects synchronized with the music, and encode music into a number of different audio formats.

Libraries are databases of digital media that organize media content. Users can create and maintain them on the memory of a computer or a portable device for different purposes such as to make the digital content and playlists available to other applications stored on the computer or generally a device. Portable user devices are often used to play digital content for the fruition of a single user who is carrying said multimedia device with him and is usually wearing, earphones, headphones, earpieces or other similar accessories.

Cloud computing is the delivery of computing and storage capacity as a service to a community of end-recipients. The name comes from the use of a cloud-shaped symbol as a generalization for the complex infrastructure it contains in system diagrams. Cloud computing entrusts services with a user's data, software, and computation over a network. Cloud computing has made possible the real-time retrieval of data and content. For example, if a user is at a party he can share a song by retrieving it from his or her library in the cloud. When a song is shared, the digital content manager software can stream the song and conventionally it will not save it on the local hard drive in order to prevent unauthorized copying. Recently Google put on the market a device called Nexus Q that when in guest mode, allows guests at a party via an Android portable device to retrieve songs from their private libraries on Google's cloud and manually queue them into a playlist. These songs are then played locally at the users' location.

Digital technology has also made it possible for digital media works to deviate from an official copy. For example, moviemakers often film alternate endings. These endings are often excluded from the official theatrical version and can subsequently be included as a special feature in the film's DVD release. These alternate endings are a special type of deleted scene. In a public performance of the official copy, the publisher or the movie director usually decides which one of the alternate scenes are included and which one is skipped.

Currently, movie theaters continuously show a movie that repeats itself to different crowds over different intervals. Movies do not adapt to different crowds, recurring viewers, or premium viewers. Moreover, audiences do not have control over the content because such content is shared with other viewers. A movie intended for a public or shared view has an official version that is distributed in certain territories or for different purposes, e.g., its enjoyment on an airplane.

An interactive movie, also known in the past as Movie Game or VCR Game is a video game that features highly cinematic presentation and heavy use of scripting, often using full-motion video of either animated or live-action footage.

This genre came about with the invention of laserdiscs and laserdisc players, the first nonlinear or random access video play devices. The fact that a laserdisc player could jump to and play any chapter instantaneously, rather than proceed in a linear path from start to finish like videotape, meant that games with branching plotlines could be constructed from out-of-order video chapters in much the same way as old Choose Your Own Adventure books could be constructed from out-of-order pages.

Current wireless technologies, such, as for example, cellular 3G, 4G, WIMAX and non-cellular WLAN, Bluetooth and its iBeacon implementation, ZigBee and RF-ID, with their improved speed of data, efficiency, and range, provide opportunities for growth, customer satisfaction, and efficiency. General positioning technologies have also evolved. Some of these technologies are more suitable for outdoor positioning. These include GPS (Global Positioning Technology), databases mapping locations of base stations/access points, multilateration and cell IDs strength measurement.

Other technologies are more suitable for indoor locationing. Examples are choke points concepts, grid point concepts, long-range sensors concepts, angle of arrival, time of arrival, received strength indication and inertial measurements, RF-ID cell, UWB, Infrared, Visible Light Communication, and Positioning techniques, and ultrasound. These short and long-range communication technologies, together with indoor and outdoor positioning technologies provide an opportunity to build backend software, applications, and devices that can exploit the knowledge a user's or a user's apparatus location by the system.

A geo-fence is a virtual perimeter for a real-world geographic area. A geofence can be dynamically generated as in a radius around a point location that could be stationary or mobile. A geofence can be a predefined set of boundaries connecting points expressed by latitude and longitude, like neighborhood boundaries. Geofencing has been made possible by the introduction of sufficiently precise locationing techniques like, for example, the GPS technology or the multilateration technology and by the miniaturization of electronic components that have made the GPS a standard feature in mobile phones and portable electronics in general.

Many other forms of alternative positioning techniques are under development.

For example, Apple introduced iBeacon to iOS, which is based on Bluetooth low energy (BLE) and is available on Android devices. Conceptually, iBeacons substitute GPS satellites whose position is known, at a micro-location or indoor scale. Several iBeacons could be located in different areas in a building.

IBM Presence Zones is a technology that lets businesses carry out web type analytics for physical venues. It lets them know who is in their physical location, how much time they spend in different areas, the routes they take, how often they visit, and more.

Google's "Nearby" feature for Android will apparently be similar to Apple's iBeacon technology to deliver notifications and trigger features.

Philips has developed a technology based on LED lighting that can communicate with a mobile application and can guide users around. Dubbed Intelligent Lighting, the connected retail lighting system not only illuminates but also acts as a positioning grid.

Other companies are building in-store retail analytics products based on Wi-Fi, cameras on the device or external, audio and magnetic fields. Based on sensing light, BLE signals, Wi-Fi signals, sound or magnetic fields, these technologies show the trend in mobile devices of adding more and more sensors to gain a better understanding of users' context and surroundings. This trend is not limited to mobile phones but it extends to the emerging wearable category of devices as well.

SUMMARY

Various aspects of examples of the invention are set out in the claims.

According to a first aspect of the present invention a method comprises: receiving a first ID (1) associated with a location area and linking said ID (1) with a data structure coupled with said ID (1); receiving a second ID (2) associated with the same said location area and linking said ID (2) with another data structure coupled with said ID (2); determining an ambience settings data output for said location area using said data structures according to a predefined set of parameters; and generating a digital signal for communicating at least part of said ambience settings data output.

According to a second aspect of the present invention, an apparatus comprises at least one processor; and at least one computer-readable medium including computer program code. The at least one computer-readable medium and the computer program code are configured to, with the at least one processor, cause the apparatus to perform at least the following: receiving a first ID (1) associated with a location area and linking said ID (1) with a data structure coupled with said ID (1); receiving a second ID (2) associated with the same said location area and linking said ID (2) with another data structure coupled with said ID (2); determining an ambience settings data output for said location area using said data structures according to a predefined set of parameters; and generating a digital signal for communicating at least part of said ambience settings data output.

According to a third aspect of the present invention, a computer software system has a set of instructions stored in a computer-readable medium for controlling at least one general-purpose digital computer in performing desired functions comprising a set of instructions formed into each of a plurality of modules, wherein each modules comprises: a process for receiving a first ID (1) associated with a location area; a process for linking said ID (1) with a data structure coupled with said ID (1); a process for receiving a second ID (2) associated with the same said location area; a process for linking said ID (2) with another Data Structure coupled with said ID (2); a process for determining an ambience settings data output for said location area using said data structures according to a predefined set of parameters; and a process for generating a digital signal for communicating at least part of said ambience settings data output.

BRIEF DESCRIPTION OF THE DRAWINGS

For a more complete understanding of example embodiments of the present invention, reference is now made to the following descriptions taken in connection with the accompanying drawings in which:

FIG. 2 is an exemplary flow diagram illustrating a process for determining ambiance settings when at least two IDs associated with two users have checked in;

FIG. 3 provides an example of a data structure representing a User Set of Parameters illustrating various embodiments of the present invention;

FIG. 6 provides an example of a data structure representing an Operator Set of Parameters illustrating various embodiments of the present invention.

DETAILED DESCRIPTION OF THE DRAWINGS

An example embodiment of the present invention and its potential advantages are understood by referring to FIG. 1 through FIG. 7 of the drawings.

Figure 1:
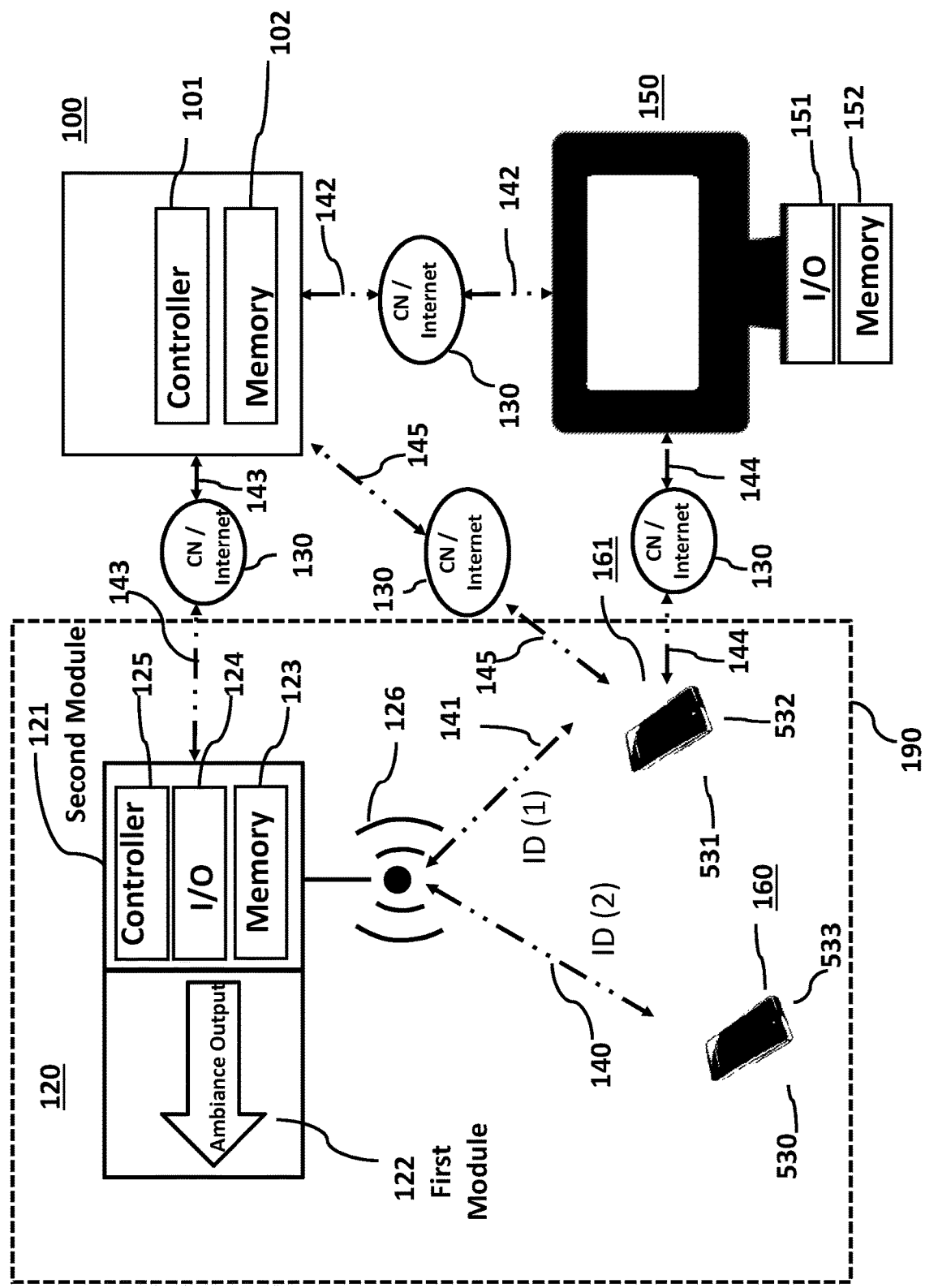
FIG. 1 provides a schematic illustration of various example embodiments of the present invention.

FIG. 1 describes a possible embodiment of the invention. User Equipment 161 (UE) can be located within an Area 190, which may represent the area where a Shared Ambiance Apparatus 120 (SAA) delivers digital output controlling "ambiance setting" affecting users located in with Area 190. These settings may include a multitude of possibilities. For example, users located in a common location may all listen to the same music, share the same temperature, ceiling fans, and lights settings, and share the vision of the same TV channels, a movie or generally digital content. For example, "ambiance settings" may comprise augmented reality digital content that is shared among users in a location as will be explained with reference to FIG. 3. "Ambience" and "ambiance" shall have the same meaning.

Digital content can be organized according to various classes. For example, associations like the Classification and Rating Administration ("CARA") issues ratings for motion pictures exhibited and distributed commercially to the public in the United States, with the intent to provide parents information concerning the content of those motion pictures and to aid them in determining the suitability of individual motion pictures for viewing by their children. The viewers of a movie or a TV program or digital content, in general, are sharing a common CARA rating. Ratings and other classes of digital media are part of what is broadly defined as ambiance settings. Ambiance settings, in general, are settings that may affect at least one of the traditionally recognized methods of perception of one or more users collocated within a common area. However, in some implementations, users may not all be equally affected within the same area by common ambiance settings.

Digital technology is expanding the range of possible shared content. For example, augmented reality (AR) is an area of technology in great expansion. Augmented reality is a live, direct or indirect, view of a physical environment whose elements are amplified by computer-generated sensory input such as sound, video, graphics or GPS data. It is connected to a more inclusive concept called mediated reality, in which a view of reality is adapted (sometimes diminished rather than augmented), by a computer. Augmentation is conventionally real-time and in semantic context with environmental elements. AR technology, when integrated with computer vision and object recognition, makes the information about the nearby real world that a user experiences interactive and modifiable. Users in a common location may share AR sensory perceptions and these AR sensory perceptions are included in the definition of ambiance settings.

With reference to FIG. 1, in one possible implementation, UE 161 may be delivering via a Wireless Link 141 a user ID (1) to Antenna 126. The abbreviation ID (1) shall refer to a first user's ID since Antenna 126 can receive more than one ID. Said transfer of ID may occur via a multitude of wireless methods including but not limited to general present cellular and non-cellular wireless technologies such as 3G and 4G or WLAN, Bluetooth, ZigBee or RF-ID. As described above, Area 190 represents the area served by a Shared Ambience Apparatus (SAA) 120. This means that all the users within the Area 190 may be affected by ambiance settings provided by said Shared Ambience Apparatus 120. Area 190 may or may not coincide with the area in which user equipment is capable of exchanging data with Antenna 126 (radio horizon area or more generally "check-in area"). A check-in area can be the area in which said UE 161 is accounted for as present in the area. SAA 120 may modify its output (as instructed by Service Server 100) to account for said presence. To simplify FIG. 1, Area 190 has been depicted as being both, the check-in area and the area where users, who are collocated within said area, can experience common or synchronized ambiance settings. The person skilled in the art will recognize that this is just a simplification and certain implementations may differ.

For the purpose of the present invention, the checking in into a location can occur automatically or by means of user's input (manual check-in). For example, UE 161 can automatically transmit ID (1) using an automated Bluetooth connection. For example, a Bluetooth module in UE 161 could transmit ID (1) to Antenna 126 at set intervals. The Bluetooth connection may use OBEX (an abbreviation of OBject EXchange, also termed IrOBEX) or any other protocol to exchange binary objects and IDs between UE 161 and SAA 120.

The person skilled in the art will recognize that many different techniques can be used to account for (or establish) the presence of a user within a check-in area. For example, UE 161 itself can establish the presence by using a GPS module or any other locationing techniques. An application running on UE 161 and stored on Memory 532 may request the position data from a GPS module and compare it with the boundaries of a predefined Geofence. In another implementation, UE 161 may send its position via Network Connection 145 to Service Server 100. An algorithm stored on Memory 102 may compare said position with certain predefined geofence boundaries defining Area 190. If the position is within the boundaries the system may consider UE 161 as checked in. In another implementation, the checking in may occur by means of a manual selection of the user. For example, a user of UE 161 may be given a list of nearby places that are equipped with a Shared Ambience Apparatus 120 (SAA) (via Network Connection 145) and he may be prompted to check-into one of these places. In other settings, the receiving of a WLAN SSID by UE 161 may trigger an application running on Memory 532 of the device to send a message via Network Connection 145 and Core Network/Internet 130 to Service Server 100 and cause the check-in into Area 190. The SSID differentiates one WLAN from another, so all access points and all devices attempting to connect to a specific WLAN must use the same SSID. Usually a public place or private household do have a unique SSID.

In case of iBeacon technology, UE 161 may be receiving an iBeacon ID by an iBeacon emitter placed within Area 190. Said ID that is received by UE 161 may be sent to Service Server 100 and can be compared with a database of iBeacon IDs stored on Memory 102 of said Service Server 100. The positive identification of said iBeacon ID may link said UE 161 with Area 190 or, e.g., with shared digital media that is streamed to that location. Said location could be, for example, a theater room, within a building where multiple theater rooms exist.

In some implementations, said iBeacon ID can be associated with an interactive shared digital work that is played in the said theater room. iBeacon IDs can be associated either to a location or to an interactive shared digital work that is streamed to or is played locally in said location. The person skilled in the art will understand that iBeacon is just one example of many technologies available where the reception of an ID by a user equipment may trigger contextual functions.

Network Connections 142, 143, 144, 145 and Core Network/Internet 130 do represent means capable of collecting and transporting digital information from and to Service Server 100, SAA 120, UE 160 and UE 161 and Workstation 150 including but not limited to wireless, cable, base stations, core network or other equipment. For the sake of clarity, the detailed description of this equipment has been omitted but the person skilled in the art will be able to retrieve detailed and enabling descriptions of the related telecommunication technologies by using, for example, one of the many telecommunications standards specifications available from standardization bodies like TIA, ETSI or IEEE.

In one implementation involving dedicated equipment, two different modules may compose said SAA 120. A First Module 122 could be equipment dedicated to delivering ambiance settings. Music and traditional digital content are just a subset of what this application names generally as "ambience settings". For the sake of clarity and simplicity, the present application will often refer to examples of digital content in the domain of music. The person skilled in the art will understand that this is only one of the possible examples. In addition, digital content is not limited to discrete pieces, such as a traditional movie or a song, but it may include subparts of digital content that assembled together may form one of the many possible versions of digital work. Said version may for example show certain scenes and skip others according to the inputs received from Service Server 100.

The person skilled in the art will recognize that traditional digital content (or more generally ambiance settings) may acquire features that are unique and tailored to the particular group of people who have checked in (the audience) by means of an algorithm running on Service Server 100. Said algorithm may mediate among various users' profiles containing data, inputs, and preferences stored in a datagram as the one described in FIG. 3. The result, in one possible implementation, can be a weighted compromise between all the possible preferences that the various users can explicitly indicate, the data that at least one of the system's algorithms may infer and the constrains that an operator of said SAA 120 may impose.

First Module 122 is dedicated to delivering ambiance settings determined by Service Server 100. It may take many different forms all of which will serve the common purpose of delivering ambiance settings mediated among users who are recognized by the system to have checked into Area 190. In one possible implementation, First Module 122 can be digital entertainment equipment capable to adapt its output to the inputs of Second Module 121 (for example alternate endings or scenes or content ratings). In other implementations it can be a thermostat, music boxes, a traditional television adapted to receive digital channels, lightning equipment, ceiling fans or other.

Second Module 121 can be dedicated to the interface with the operator and to the exchange of information with user equipment (such as UE 161 and UE 160) and remote Service Server 100. Said Second Module 121 may include a Controller 125 capable of interpreting the information received from Service Server 100 via a Network Connection 143 and cause First Module 122 to deliver ambiance settings in accordance with instructions received from Service Server 100. Second Module 121 may also include an Input-Output (I/O) module 124 and a Memory 123. In a possible implementation, Controller 101, contained in Service Server 100, may determine the output of ambiance settings to be delivered by First Module 122 by using a User Set of Parameters 300 and an Operator Set of Parameters 600 in conjunction with at least one algorithm stored on Memory 102. Details and examples of said User Set of Parameters 300 and said Operator Set of Parameters 600 will be provided while describing FIG. 3 and FIG. 6. User Set of Parameters 300 will generally refer to preferences or data relative to a user associated with a user ID; said preferences and data can be enclosed in datagrams as the ones described in FIG. 3.

More than one ID can check-in into Area 190. In FIG. 1, user ID (1) can be transmitted via a Wireless Link 141 from UE 161 and another ID (2) can be sent via Wireless Link 140 from UE 160 to Antenna 126. ID (1) and ID (2) can be associated with two different user set of parameters related to two different users. Said user set of parameters can be enclosed in two different datagrams each one of them similar to the one described in FIG. 3 and stored on Memory 102, Memory 123 or both, at least temporarily.

An Operator Set of Parameters 600 will often refer to preferences and data contained in a datagram relative to a person who is the operator of said Shared Ambience Apparatus 120 (SAA). Said operator could, for example, be the proprietor of a sports bar or the owner of a restaurant or the operator of a movie theater or the owner of a private household. Second Module 121 may also contain an Input/Output (I/O) Module 124 and a Memory 123. Said I/O Module 124 may serve the purpose of creating and modifying said Operator Set of Parameters 600 to be stored in Memory 123 or to be sent via Network Connection 143 and Core Network 130 to Service Server 100 and then stored in Memory 102. Service Server 100 may comprise at least a Controller 101 and a Memory 102. Said Memory 102 may host computer code and at least an algorithm configured to determine the commands that will produce the ambiance output to be delivered by said First Module 122.

The person skilled in the art will recognize that the ambiance settings output can be the result of determinations made by one or more algorithms. For example, if both User Sets of Parameters and the Operator Set of Parameters reside on Memory 102 a single algorithm, also possibly residing on Memory 102, can determine the ambiance setting output. Alternatively, the ambiance settings output can be calculated by using more than one algorithm in parallel or in sequence. For example, one algorithm on Memory 102 could be in charge of weighting all the User Sets of Parameters and another algorithm on Memory 123 could be in charge of factoring in the Operator Set of Parameters.

In one explanatory example when only UE 161 sends ID (1) via Wireless Link 141 said ID (1) could be sent over to Service Server 100 via Network Link 143. An algorithm residing on memory 102 may determine the output of digital content by using a User Set of Parameters 300 associated with said I.D (1). In another example, if also an Operator Set of Parameters 600 is active and is stored on Memory 102 the algorithm may use both, said Operator Set of Parameters 600 and said User Set of Parameters 300 to determine the digital command that will produce the ambiance output to be delivered by said First Module 122.

In another explanatory example, not only UE 161 sends ID (1) via Wireless Link 141 but also UE 160 sends ID (2) via Wireless Link 140. Said ID (1) and ID (2) may then be sent from Second Module 121 to Service Server 100 via Network Connection 143. The algorithm residing on Memory 102 may now determine the output of ambience settings by using a User Set of Parameters 300 associated with said ID (1) together with another different User Set of Parameters associated with said I.D (2) (also similar in structure to the one represented in FIG. 3) and an Operator Set of Parameters 600. The person skilled in the art will recognize that in many settings the number of received IDs may be high especially in crowded places. Every received ID can be associated with a specific user set of parameters and the algorithm may mediate among all the users' set of parameters using different weights and criteria.

In one implementation, the weight associated with a certain ID may increase with the increasing of the duration of the permanence of that ID in the checking in area. In addition, the algorithm may consider certain patterns and recurrences. For example, if certain IDs are a recurrent presence in the check-in area on certain days of the week or time windows during the day, the algorithm may consider said recurrences and proactively generate ambient settings commands that will account for said recurrences.

Recurrences can also be used with adaptive shared digital media. In one implementation, adaptive shared digital media is media that adapts to viewers. For example, if the system detects that some users have already seen or experienced a first version of a digital work, said the system may promote the showing of a different, alternate, or premium version of the work to maximize the enjoyment of those recurring users.

In another implementation, interactive shared digital media is media that can adjust in real-time, or over time, to inputs of at least part of the audience who is enjoying said interactive shared digital media and is using means for providing said inputs.

In another implementation, in case of an adaptive shared digital media, certain users may have more weight than others do. For example, a user who has already watched a first version of a shared digital work, e.g. a movie in a public theater equipped with a Shared Ambience Apparatus 120 (SAA), may decide to watch the same movie multiple times. Said category of users may acquire a premium status and unlock premium features of the adaptive digital media. Those users may become the popular users that everybody wants to go to the movie theater with since they will be the ones who may drive up the level of collective entertainment.

In another implementation, in case of an interactive shared digital media, two or more users may be equipped with UE 161 and UE 160. Said user equipment may store in Memory 532 a software application that can be synchronized with the digital work being played and will allow input from the audience. This will be explained in more detail with reference to FIG. 7.

In one implementation, algorithms and computer code can be residing in Memory 102. In another implementation, said algorithms may determine the output of ambiance settings according to different weights for different users. For example, if ID (1) is associated with a paid premium service the datagram associated with the ID (1) may carry a higher weight as compared to the datagram associated with ID (2). As a further explanatory example, certain users IDs may progressively acquire higher weights if the system perceives an increasing duration of their permanence within the check-in area.

In another implementation that will be explained in more detail with reference to FIG. 7, certain users may enjoy alternate, modified, extended or premium versions of the same digital media if those users have a premium status or have enjoyed previous versions of the same digital media. The usage of adaptive or interactive shared digital media may achieve a "gamification" effect resulting in more engagement by the audience and repeated views of alternate or modified versions of the same digital work.

The analytics of the duration data related to certain IDs in the check-in area may promote certain users as regulars of the business establishment that is equipped with said Shared Ambience Apparatus 120 (SAA) and give them a higher and preferential status. As another example, the operator of said Shared Ambience Apparatus 120, who, in a possible implementation, is also the business operator of the premises, may sponsor regular clients and manually confer them a higher status. The hierarchy among IDs can also be associated with the amount of money spent by a user associated with a particular ID so that premium clients can enjoy ambiance settings that are more customized to their taste or that are likely to maximize their enjoyment.

In another possible implementation, a higher weight can be given to an ID that receives positive feedback from other users. For example, the user of UE 161 that is associated with ID (1), while listening in real-time to certain digital content being provided via First Module 122 within Area 190, may give positive feedback by using an Input-Output Module 531 of UE 161. User of UE 161 may send over Network Connection 145 or Wireless Link 141 a digital signal indicating his or her approval of the digital content being played. As a consequence, ID (2), which is associated with user of UE 160 and a datagram of parameters and data resulting in the digital content that is being played (or more generally ambiance settings), may gain more weight in upcoming selections of digital content and ambiance settings in general.

In one implementation, Workstation 150 (accessible to user of UE 161 since user of UE 161 can also at times be the user of Workstation 150) may contain digital content files, such as music, organized in libraries and contained in Memory 152, that can be downloaded by user of UE 161 on his device. UE 161 may synchronize with Workstation 150 via Network Connection 144 said digital content. The same digital content can be present on both Memory 152 of Workstation 150 and Memory 532 of UE 161 as it is the case in some current implementations. Said digital content or the associated libraries can also be sent over to Service Server 100 from Workstation 150 via Network Connection 142 or directly from UE 161 via Network Connection 145.

In a possible implementation, only libraries and indexes are sent over to Service Server 100 while the digital content can be present on Service Server 100 or can be retrieved by Service Server 100 and can be associated with said libraries and indexes. This solution may become more and more popular in the future considering the fast pace development of cloud services. In another implementation, there is no need for UE 161 or Workstation 150 to store digital content. All the digital content can be stored on servers and delivered via streaming on demand; for example, digital content can be streamed from Service Server 100 directly to Shared Ambience Apparatus 120 (SAA) via Network Connection 143.

The person skilled in the art will recognize that many variations to FIG. 1 are possible. For example, the user of UE 161 and Workstation 150 can send or update his or her User Set of Parameters 300 via Input/Output Module 151 or Input/output Module 531. Network Connections 142, 143, 144 and 145 can generally be cables, wireless connections, or any other communication channel, as long as capable of convening digital information. Finally, with the fast development of electronics and the growth of computing, network and memory capacity, Workstation 150 may become unnecessary and all the operations and selections can be performed directly via UE 161 by communicating directly with Service Server 100 or Shared Ambience Apparatus 120 (SAA).

In one implementation First Module 122 can deliver not only digital entertainment such as music (or ambiance settings in general) but also an indication of the ID and the identity of the user whose preferences and habits have caused the ambiance settings output at a given instant. For example, the name or the picture of user of User Equipment 161 can be shown on a screen in Area 190 as depicting the user who should be credited for the ambiance settings output being delivered to users within Area 190 during a determined moment in time. Said indication of the ID and the identity of the user whose preferences, inputs, or habits have caused the ambiance settings output at a particular instance can also be displayed by UE 161, UE 160 or any other user equipment within Area 190.

The person skilled in the art will recognize that what is named a Shared Ambience Apparatus 120 (SAA) in one possible implementation can be an apparatus as simple as another general-purpose computer Workstation 150 having or connected to music boxes, a video screen, or any other apparatus capable of delivering sensory stimulations to end-users. In other settings, a Shared Ambience Apparatus 120 (SAA) is a dedicated apparatus if the outputs are ambiance settings that require dedicated equipment.

In addition, Shared Ambience Apparatus 120 (SAA) may or may not be composed of two separate modules (First Module 122 and Second Module 121). In fact, the functions performed by those two modules can be combined into a single apparatus.

In some implementations, SAA 120 can be an apparatus as simple as portable User Equipment such as UE 160 or UE 161 (in some implementations smartphones) and perform limited functions, since ambiance, such as music, can be streamed directly to mobile equipment such as UE 160 and UE 161. In this implementation, User Equipment (now functioning as SAA 120) may establish by means of its location capabilities a fixed anchor point associated with Area 190. Said anchor point can be visible to UE 160 and UE 161 by means, for example of map representation of all the anchor points that have been generated around them. UE 160 and UE 161 may connect to said anchor point by means of wireless connections such as Link 145. If connected to said anchor point, said UE 160 and UE 161 may be able to enjoy ambiance such as a stream of music that is delivered to them. For example, said stream of music may contain preferred playlists as described in Column 620 of Operator Set of Parameters 600.

In certain implementations, UE 160 and UE 161 may be capable of influencing said stream of music according to some of the various criteria that are described in the present application. The creation of anchor points can be regulated so that no more than a predetermined number of anchor points can be created in the same location. Alternatively, only premium users can create anchor points.

FIG. 1 of U.S. Pat. No. 8,880,101 of the same inventor, may provide a visual representation of an anchor point with "Location 180". In certain implementations, an anchor point is created by User Equipment in the same place where it is located and it can be visible to nearby equipment, such as UE 160 and UE 161, for a predetermined period of time or indefinitely. This is the equivalent of the Session Areas (or events) that are described in U.S. Pat. No. 8,880,101 of the same inventor. In the same way, as users could join events in U.S. Pat. No. 8,880,101, users can now join streams of ambiance such as music playlists, if certain location criteria are met, such as, e.g., the presence of UE 160 or UE 161 within the boundaries of an area such as Area 190.

Area 190, in some implementations, can be a circular area having a predetermined radius that is centered on the said anchor point. All UEs within the said area may join said anchor point and enjoy, modify, and influence a stream of music that is defined according to an Operator Set of Parameters 600.

In this implementation, a plurality of user equipment apparatuses collocated within Area 190 and connected to the same anchor point may contemporaneously provide music to users via headsets or loudspeakers.

In another implementation that is going to be further explained with reference to FIG. 3, there is no need for said Shared Ambience Apparatus 120 (SAA) to be located within Area 190. As discussed, for the sake of convenience and simplicity, Area 190 has been described both as 1) the area in which ambiance settings affect users located within that area; and 2) as the area in which the system will account for the presence of a user in generating the ambiance settings (if his user equipment reports itself as being within the check-in area). Those two areas can be separate and distinct even though in some cases and implementations those areas may overlap. The person skilled in the art will understand that this is a simplification.

In order to explain a case in which the presence of a Shared Ambience Apparatus 120 (SAA) is likely to be located outside Area 190, we can refer to augmented reality technology. Augmented reality can be "shared" or "personal". In the case of shared augmented reality, users collocated within the same area, will experience the same (or at least synchronized and interdependent) ambiance settings while using or wearing augmented reality equipment. If augmented reality is "personal" then users collocated within the same area or location may experience ambiance settings that are independent and not synchronized.

A possible implementation of this concept can be an augmented reality traffic light. As an example, if two or more cars (or their drivers), are equipped with augmented reality equipment and are about to approach an intersection from different directions they all may check-in into the same check-in zone. In that situation, a shared (or synchronized) augmented reality digital content can be delivered to all of the cars (or drivers) so that the need for a physical traffic light apparatus may disappear. The digital signal inducing the representation of a traffic light via augmented reality equipment may come wirelessly from Core Network/Internet 130 equipment positioned outside Area 190, perhaps a base station working accordingly to a 4G standard. In this case, what I named SAA 120 can be located outside Area 190 and the ambiance settings are augmented reality representations generated upon the reception of wireless information for fruition within Area 190. Alternatively, First Module 122 of said SAA 120 could be considered the very same augmented reality equipment that is personal or specific to each driver or car.

In another embodiment, a traffic light apparatus can be a physical object and it may receive ambiance settings from Service Server 100; in this case, the ambiance settings can simply be the green, yellow and red traffic indications. In this case, SAA 120 can be located within Area 190 and can be a remotely operated traffic light that may consider real-time preferences, settings, and situations as described above.

With reference to this scenario, the algorithm may use a different kind of parameters so that certain drivers may receive preferential treatment according to various scenarios. As non-limiting examples: drivers can pay to receive a preferential tier; drivers may receive preferential treatment if they check-in more frequently into the particular area; older drivers or any public service driver may also be preferred. The possible scenarios, possibilities, and advantages are extremely numerous since the person skilled in the art will understand that one aspect of the present invention may permit sizable savings by avoiding the actual construction of physical infrastructure that is currently necessary to regulate and make automotive traffic safe and efficient.

Figure 2:
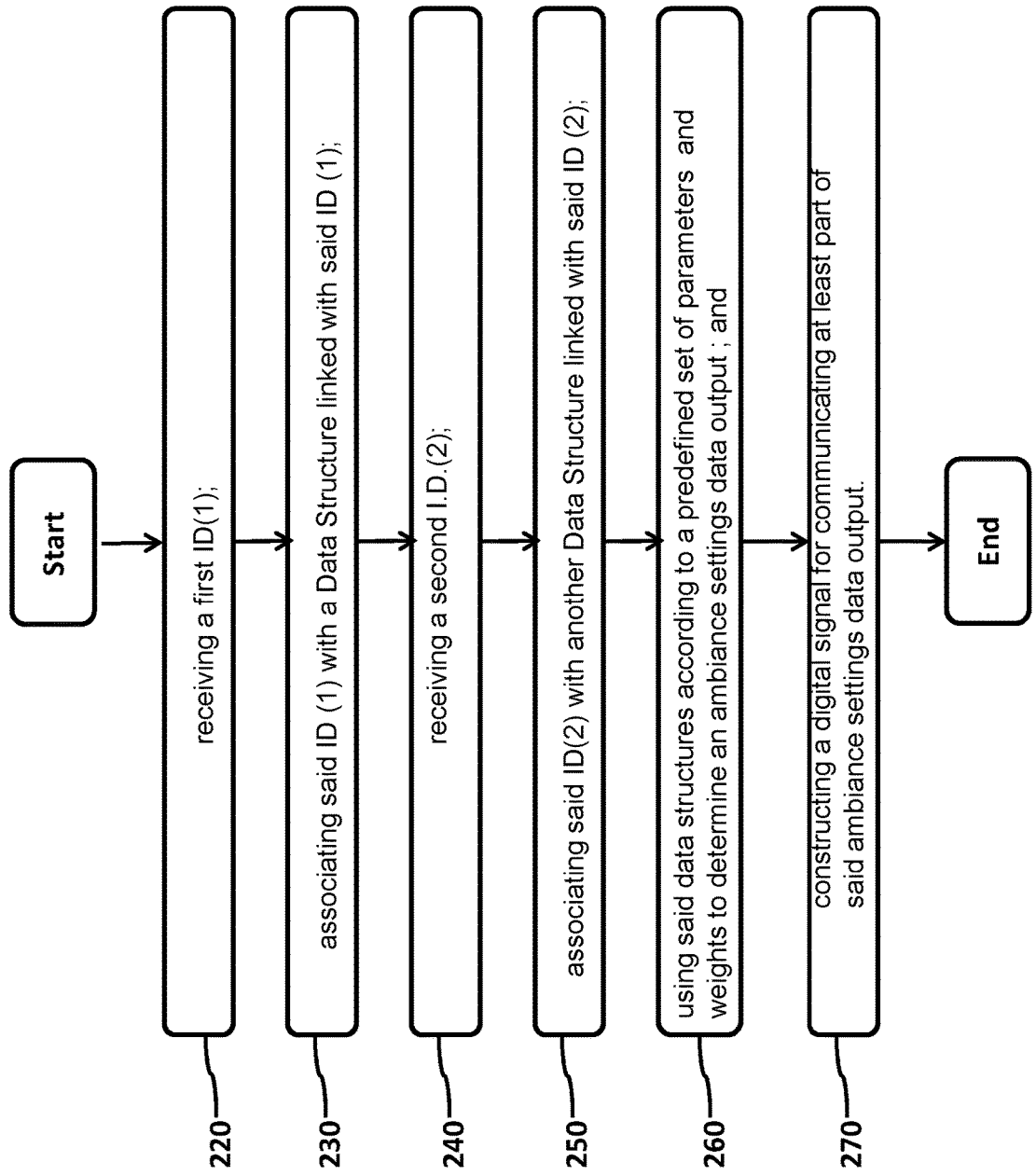

FIG. 2 represents a possible method embodiment of the present invention that can be implemented, for example, by means of a Service Server 100. Said method may comprise: receiving a first ID (1) (step 220); associating said ID (1) with a Data Structure linked with said ID (1) (step 230); receiving a second ID (2) (step 240); associating said ID (2) with another Data Structure linked with said ID (2) (step 250); using said data structures according to a predefined set of parameters and weights to determine an ambiance settings data output (step 260); and constructing a digital signal for communicating at least part of said ambiance settings data output (step 270).

In one possible alternative implementation, that is different from the one described in FIG. 1 (where Service Server 100 is the apparatus configured to execute the method described in FIG. 2 above), Second Module 121 may also execute the method described in FIG. 2. In this implementation, Memory 123 may have received and is storing the data structures associated with the various IDs. It may also store application software comprising the algorithm configured to determine ambiance settings. In this possible implementation, said Shared Ambience Apparatus 120 (SAA) would be an autonomous unit capable of determining ambiance settings and Service Server 100 would be not necessary.

FIG. 3 represents a possible User Set of Parameters 300. This datagram contains information about the user's preferences, settings, and data. Column 310 describes non-limiting examples of some Ambiance Classes. For example, Music 311, Light Ambiance 312, Ceiling Fan 313, Temperature 319, TV Channels 314, Movies or Mixed Digital Content 315, Games 316, Augmented Reality 317 and in particular, Shared Augmented Reality 318. Shared Augmented Reality 318 means that users collocated within the same area will experience the same or synchronized ambiance settings and sensory inputs via their augmented reality equipment. In some implementations, synchronized means that the ambiance settings for the users may not be the same but they will be interdependent. For example, a user at a traffic light may see a red light while another may see a green light depending on their position and orientation.

Column 320 describes Class Preferences namely personal libraries or details of preferences for each Ambiance Class 310. These preferences usually derive from explicit settings of the user. For example, within Music 311, a user can indicate his or her preferred genres, singers or songs. User Libraries & Preferred Playlist 322 can also be retrieved from either Workstation 150 or UE 161 and can be stored in User Set of Parameters 300.

In one implementation, Discrete and Mixed Digital Content 315 is digital content that, for example, can be retrieved from the cloud and that can be streamed to users within Area 190, in the same way as Music 311. This class comprises both discrete (a traditional movie for example) and audio-visual digital content that may morph and vary (mixed digital content) according to the audience's preference. Interactive and adaptive shared digital works are included in this category.

Adaptive digital works may adapt without the need for user intervention. For example, a user who is recognized by the system to have experienced a previous version of the digital work may experience a different version without the need for any input. Field Recurrence 319 may store indications of previous visions of the same family of digital content to provide alternate or premium versions to users with the highest number of visions of the same family of digital works or a premium status.

Interactive digital works may compound all the explicit choices of the audience that is providing feedback and morph according to a weighted algorithm of all those choices in real-time.

Field 343 may list various preferences for genres. Preferences can be expressed by a numerical value. In one implementation, an algorithm that may be running on Service Server 100 will consider said preferences and may adapt the digital content to said preferences. For example, an adaptive shared digital work such as a movie can be a weighted result of the preferences of those users who have checked into Area 190. Second Module 122 may accordingly show certain scenes while skipping other scenes and in so doing build a digital content work that is unique to the audience.

Column General User Data 330 represents an example of data that can be stored in a datagram and that can be used by a software algorithm (stored in Memory 102 or on Memory 123) to create ambiance settings output. These fields generally store user's data that may not always be the direct result of user's choices but are data that may be inferred by the system by analyzing analytics and data acquired over time pertaining to the user, such as browsing habits, or location patterns. Alternatively, these data are factual data, like gender or a date of birth.

Certain IDs may enjoy a premium status or a higher User Tier 331. A premium status may derive from being a regular in a certain public place (for example because of the duration of their permanence in Area 190) or from manual entry by the operator of SAA 120 who wants to support a subset of his clients. Higher User Tier 331 means that the User Set of Parameters 300 associated with that particular ID may have a superior weight when factored in by said software algorithm that is in charge of determining the ambiance settings output for Area 190. As discussed, User Tier 331 may also compound multiple visions of the same family of digital works in a movie theater.

Positive feedback to digital output being played (or ambiance settings in general) associated with a particular ID may also play a role. For example, the user of UE 160 that is associated with ID (2) while experiencing in real-time within Area 190 certain ambiance settings that are associated to ID (1) can give positive (or negative) feedback by using an Input-Output Module 530 of UE 160. This may affect a User Popularity Index 332 field associated with ID (1).

A User Persistence 333 filed indicates how long an ID has been within the checking in area. The algorithm may put a higher weight on IDs that have been in the area for a long time as compared to others that have just checked in. This field may also capture patterns of regular clients, big spenders, and promote regulars to a higher User Tier 331.

A Paying User 334 field captures the information that certain users may be willing to pay for a premium service so that their IDs can have a higher User Tier 331 when computed in by an ambiance settings algorithm.

An Analytics User's Profile 335 field captures inferences, patterns, and recurrences related to a user. For example, a user can be a regular on certain days of the week or time windows of the day. The system may predict his future presence and generate an ambiance output tailored to that user in certain time windows.

The system may also correlate users who have similar preferences. The system may infer and attribute preferences to users even if those preferences have not been explicitly expressed. This is captured in the Inferred User Profile 336 field.

In some implementations, a user may decide to charge his credit card for the option of directing said Shared Ambience Apparatus 120 (SAA) to deliver a determined ambiance settings output such as playing a selected piece of digital file, a song for example. This may overrule a User Tier 331 field or other parameters. The data associated with a credit card can be pre-stored into a Credit Card Number 337 field. This may make SAA 120 the equivalent of a modern jukebox. This example is not limited to music but it may generally be applied to any ambiance settings.

A Date of Birth 338 field can be used to store data to be used for a variety of purposes. For example to derive CARA ratings that may be applied as a minimum common denominator to the ambiance settings output. For example, if there is an ID that is associated with a minor among those IDs that have checked in into Area 190 then the ambiance settings output may be tailored to a minor audience. In addition, places may privilege older or younger patrons: the algorithm may discriminate by using Date of Birth 338 field.

The algorithm can also use a Gender 339 field to discriminate between different kinds of clientele. For example, if the operator of a commercial establishment thinks that attracting more women would benefit his business then he may task an algorithm with privileging IDs associated with users who are females. SAA 120 may consequently deliver ambiance settings more attuned with a female taste.

Tagged Items 380 field stores all the tagged items that a user may flag during the execution of digital work, as will be described with reference to FIG. 7.

Column General User Preferences 340 may list preferences that are more specific and detailed as compared to those described in Column 320. For example, it may store exclusions for music genres, certain discrete pieces of digital entertainment or TV channels as in Field 341 and Field 342. Exclusions can also be more general ambiance settings. For instance, a user can exclude room temperatures below 70 Fahrenheit (° F.). The algorithm may consider these exclusions while determining the ambiance settings output.

Field 343 can contain preferences for genres of digital entertainment. For example, a movie can rarely be categorized in absolute terms as belonging to a particular genre but it is always a mix of genres and situations. As a non-limiting example, if a user indicates his preferences for movies, by distributing a fixed amount of units among different genres and features categories, then an algorithm compiling a variable digital data entertainment output, (a subclass of ambiance settings), may tailor said output to the specific audience by including or excluding scenes and features.

Figure 4:
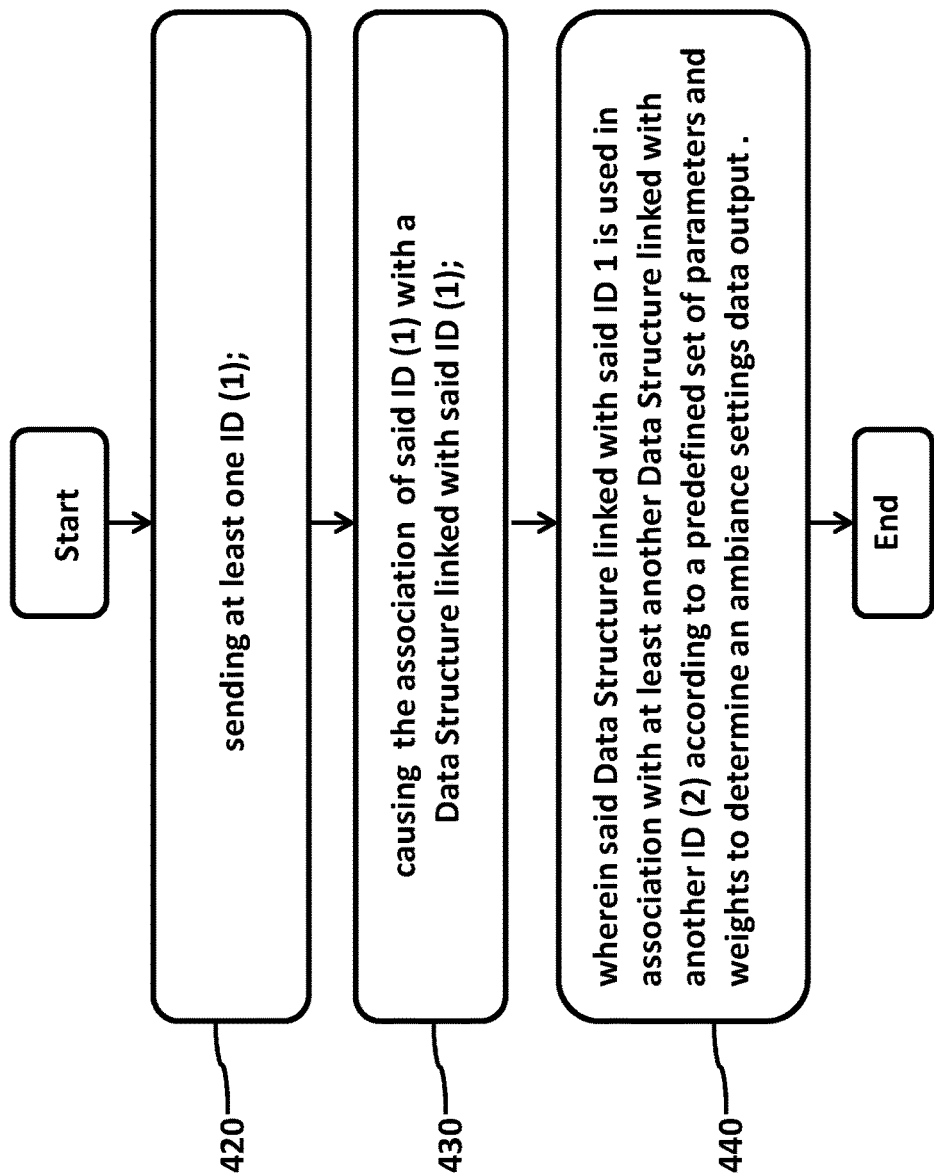
FIG. 4 is an exemplary flow diagram illustrating a process for causing ambiance settings related to an area to at least partially to adapt to the data and preferences contained in a data structure associated with a user ID.

FIG. 4 represents a possible method embodiment of the present invention. The method described may comprise: sending at least one ID (1) (420) and causing the association of said ID (1) with a Data Structure linked with said ID (1) (430); wherein said Data Structure linked with said ID (1) is used in association with at least another Data Structure linked with another ID (2) according to a predefined set of parameters and weights to determine an ambiance settings data output. As will be discussed with reference to FIG. 5, apparatuses as simple as an RFID tag can implement the method described in FIG. 4.

Figure 5:
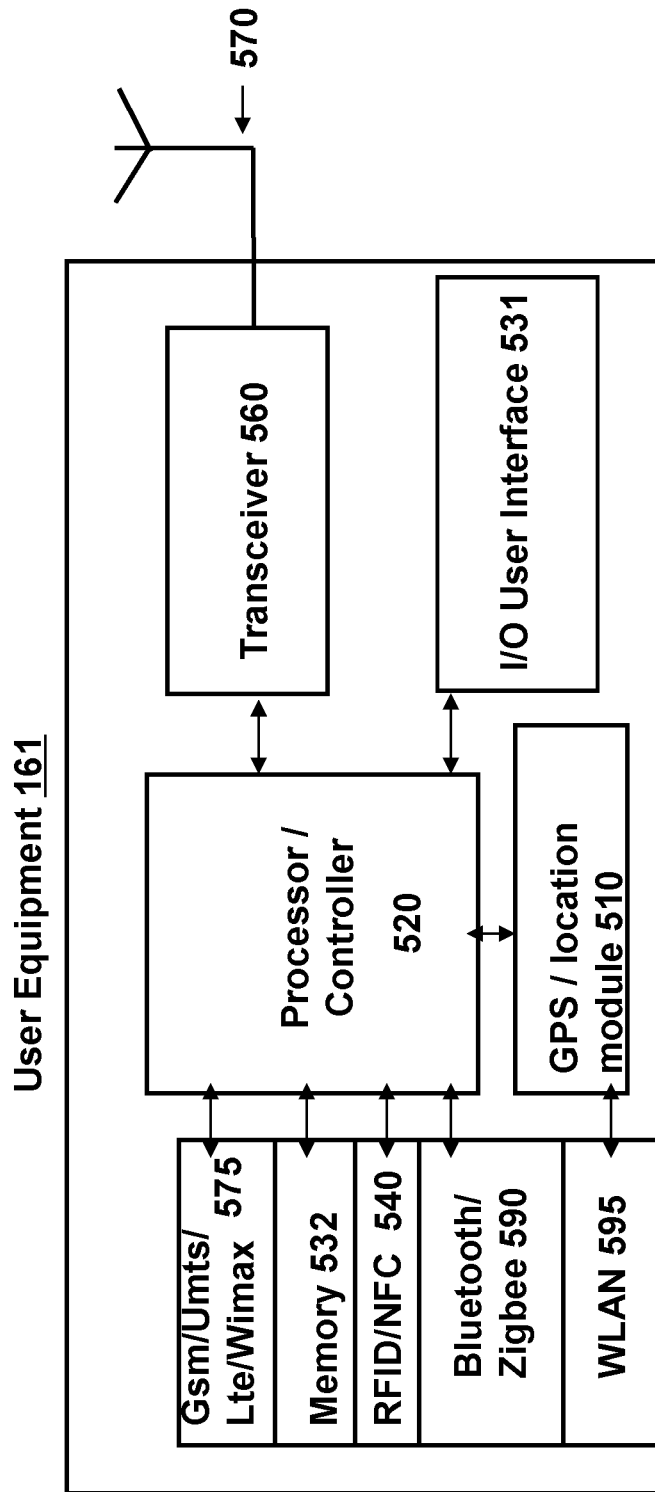
FIG. 5 is a schematic example of user equipment (UE) illustrating various modules that can be used to implement various embodiments of the present invention.

FIG. 5 represents one possible apparatus embodiment of User Equipment (UE) 161. The person skilled in the art will realize that the present invention can be implemented according to embodiments that do not necessitate every module that is described in FIG. 5 that are common of smartphones or computer-like equipment. In addition, the using of a login and a password associated with an ID to access an application running on mobile equipment can make UE 161 or UE 160 interchangeable among users. IDs can be unique to certain users rather than to certain apparatuses.

User Equipment 161 is a general example of a terminal device that users can operate. It can be a traditional smartphone, a personal digital assistant, a laptop computer, an e-book reader, an entertainment console or controller, wearable hardware such as augmented reality headsets, a tablet computer or any other portable device including a transponder such as an RFID tag as long as capable of communicating at least digital information linked with a user ID. The association of a user ID with a location area (such as Area 190) may derive from the relatively short radio horizon of non-cellular wireless standards such as WLAN, Bluetooth, RFID, and others. In some cases, the check-in area is within (or of a size comparable to) the ambiance settings area so the IDs that have checked in can be automatically associated with a location area. If the location information associated with an ID needs to be transmitted to a Service Server 100, Second Module 121 can do so. In another implementation, UE 161 may directly communicate with Service Server 100 and provide both ID (1) and the location data of UE 161. A location data of UE 161 transmitting ID (1) can be associated with a location area such as Area 190 by Service Server 100 or by SAA 120.

With reference to the RFID/NFC 540 module, apparatuses as simple as an RFID tag embedded in a bracelet can be sufficient to embody the present invention. In this implementation, ambiance settings may simply adjust in Area 190 to account for all the IDs that are checking in and all the IDs that are checking out. An RFID reader, placed in Area 190, may broadcast an encoded radio signal to interrogate the RFID tag. The tag's information can be stored electronically in non-volatile memory. The RFID tag may include a small RF transmitter and/or a receiver. The tag can receive the message and can reply with its identification information. This can be a unique tag serial number. In the case of the present invention, it can be a code associated with users' unique IDs as ID (1) and ID (2) described in FIG. 1. A database stored in Memory 123 or Memory 102 can associate said individual serial numbers with users' IDs.

The person skilled in the art will realize that even if the invention can be implemented by using an apparatus as simple as an RFID transponder that is worn by a user and is associated to a profile stored on the cloud or a nearby Shared Ambiance Apparatus 120, certain functionalities previously described can be more easily implemented by using apparatuses that are more complex. For example, an input/output module, like I/O User Interface 531, can be used to provide feedback to Service Server 100 or to activate other functionalities described in the present application. I/O User Interface 531 may allow inputting information via a touch screen or a QWERTY keyboard. I/O User Interface 531 may also include a vibrating notification module, a speaker or a monitor (or any combination thereof). Input/output modules can also be a fixture of Area 190 so that different users can share said modules if needed.

RFID tags can be either passive, active or battery-assisted passive. An active tag has a battery and can periodically transmit its ID signal. Periodicity can be used to establish a duration value of the permanence of a particular ID in the check-in area. A battery-assisted passive (BAP) has a small battery on board and can be activated when in the presence of an RFID reader. A passive tag is usually smaller because it has no battery. In this case, the duration of the permanence of IDs within the check-in area can be established by using the periodicity of the interrogation by the RFID reader. A passive tag uses the radio energy transmitted by the reader as its energy source. Tags have individual serial numbers and the RFID system design can discriminate several tags that might be within the range of the RFID reader and read them simultaneously.

User Equipment 161 can also comprise an Antenna 570 and a Transceiver 560 capable of transmitting at least an ID (1) to a Shared Ambience Apparatus 120 (SAA) or directly to Service Server 100 via Network Connection 145 and Core Network/Internet 130 when Processor/Controller 520 directs Transmission Module GSM/UMTS/LTE/WiMAX 575 to do so. Transmission Module GSM/UMTS/LTE/WiMAX 575 represents a multimode module capable of connecting to a cellular network via at least one of the mentioned cellular standards or any equivalent standard that standardization bodies may codify in the future.

Modern 3G and 4G cellular standards may produce a significant radio horizon. If the sending of ID (1) occurs directly via Network Connection 145 and Core Network/Internet 130, instead of Wireless Link 141 via a non cellular standard such as WLAN, then said ID (1) can be accompanied by an indication of the whereabouts of said User equipment 161 (such as Area 190) so that Service Server 100 may send ambiance settings indications that are pertinent to the particular zone of presence of user of UE 161.

Antenna 570 may support beamforming and/or multiple-input multiple-output (MIMO) operations. As is known to those skilled in the art, MIMO operations may provide spatial diversity, which is to overcome difficult channel conditions and/or increase channel throughput. Antenna 570 may include antenna tuning and/or impedance matching components, RF power amplifiers, and/or low noise amplifiers. User Equipment 161 can be optimized to support multiple transceivers using multiple wireless standards.

User Equipment 161 may also comprise a GPS/Location Module 510. Said GPS/Location Module can be used for various functions, for example when it recognizes that UE 161 is within Area 190 it can feed the information to Processor/Controller 520 for triggering (manually or automatically) the transmission of ID (1). Alternatively, the transmission of ID (1) can be triggered (automatically or manually) by means of an RF-ID system or other wireless modules like a Bluetooth/Zigbee 590 module or WLAN 595 module. In one implementation, the sending of ID (1) can be triggered via manual input of user via User Interface 531. For example, user can be given a list of nearby places that are available for check-in.

The locationing component of the invention can be advantageously implemented in many different ways. When in closed environments, such as a shopping mall, the location data can be provided via different techniques. For example, choke points or grids, namely location indexing and presence reporting for tagged objects, can be used to provide location data when indoor. Other examples of techniques used to provide location are the angle of arrival, time of arrival, received signal strength indication, inertial measurements and ID databases of WLAN access points, iBeacon equipment or other techniques as described in the background section of this application.

Memory 532 may store ID (1) as well as other data such as user libraries of digital media or digital media files. Memory 532 may also store software applications adapted to enable User Equipment 161 to provide to the user the possibility, via User Interface 531, to cause User Equipment 161 to send a coincident digital signal indicating his appreciation (or dislike) ambiance settings that are concurrently delivered within Area 190 by Module 122.

Equipment 161 can include at least one Processor/Controller 520 and at least a Memory 532 including computer program instructions. The at least one Processor/Controller 520 can be embodied by any computational or data processing device, such as a central processing unit (CPU) or application-specific integrated circuit (ASIC). The at least one Processor/Controller 520 can be implemented as one or a plurality of controllers. Memory 532 may contain application software running on User Equipment 161. The at least one Memory 532 can be any suitable storage device, such as a non-transitory computer-readable medium. For example, a hard disk drive (HDD) or random access memory (RAM) can be used in the at least one Memory 532. The at least one Memory 532 can be on the same chip as the at least one Processor/Controller 520 or could be separated from the at least one Processor/Controller 520. The computer program instructions may be any suitable form of computer program code. For example, the computer program instructions may be a compiled or interpreted computer program. The at least one Memory 532 and computer program instructions can be configured to, with the at least one Processor/Controller 520 to cause a hardware apparatus (for example, User Equipment 161) to perform any process described herein.

FIG. 6 represents a possible embodiment of an Operator Set of Parameters 600. This datagram contains data and preferences related to a person who may have authority over the operation of said Shared Ambiance Apparatus 120 (SAA). This person can be the manager of a business enterprise in charge of delivering ambiance settings to patrons within Area 190. In another implementation, it can be a homeowner or any other entity with the authority to constrain the output of ambiance settings within Area 190, for example, a traffic authority agency as explained in a previous example related to augmented reality. Operator Set of Parameters 600 is not an essential element for the invention to work. It is nevertheless a useful instrument if it is desirable to set boundaries to the degree to which users making their presence known within Area 190 can influence an algorithm in charge of weighting and mediating among various User Sets of Parameters 300 and determine common ambiance settings.

In one implementation, in case of adaptive or interactive shared digital media, Operator Set of Parameters 600 can include under Operator Data 630, settings so that said adaptive or interactive digital media may be constrained within the guidelines of the Content Ratings Association and be suitable to different audiences at different times.

Operator Set of Parameters 600 can be a datagram that largely mirrors the User Set of Parameters 300. Column 610 describes non-limiting examples of some possible Ambiance Classes. Column 620 describes Class Preferences namely libraries or details of preferences for each Ambiance Class 610. These preferences may derive from explicit settings of the Operator. For example, in the case of Field 641, a traffic authority may prioritize IDs belonging to public service workers to improve public service efficiency. Operator Set of Parameters 600, under certain conditions, can override preferences related to IDs checking into area 190. Alternatively, Operator Set of Parameters 600 can be used as default settings in absences of IDs that have checked in Area 190.

Column 630 describes General Operator Settings. For example, an operator may want to privilege certain customers by listing their IDs in the Preferred User 631 field so that those users may influence the ambiance settings more than others. An Operator may also want to privilege a certain clientele that is older or younger than a certain age according to a certain target clientele. He can do that by using a Date of Birth 632 field and by setting his preferences. An Operator can also set a preferred range of ages such as patrons who are between 45 and 55 years of age if, for example, this is the most lucrative class of patrons. In some implementations, on the day of a user's birthday said user may acquire a preferential status.

Gender 633 field is another example of a possible hierarchy among classes of IDs. A clientele of females can be preferred over males, for example. Timers 621 field can indicate that the operator may have different settings over different periods. For example, early in the evening, certain genres can be preferred, for example, upbeat music, while late in the evening the preference may change to slow music that couples can enjoy. Timers can also be used to regulate the pace at which the output of digital content may change. For example, an operator may not want the system to be too susceptible to the flow at which patrons may come and go.

Column 640, General Operator Preferences, may list exclusions. For example, in a sport bar where patrons are on average adults cartoon program channels can be excluded. Vice versa in a Mc Donald's, where kids are welcome and form a big portion of the clientele, certain channels with questionable shows can be banned. An operator can achieve this by using a Sexual Explicitness 643 field. Field Sexual Explicitness 643 can be used, for example, in relation to digital content that can vary and adapt to various audiences by including or excluding various scenes in a movie as previously described.

A Content Rating 644 field can be used to include or exclude digital content as rated by the various public agencies such as, for example, the Classification and Rating Administration ("CARA"). By using this field, the operator of a public place can exclude movies or shows intended for mature audiences if one or more IDs that have checked in Area 190 belongs to minors.

Figure 7:
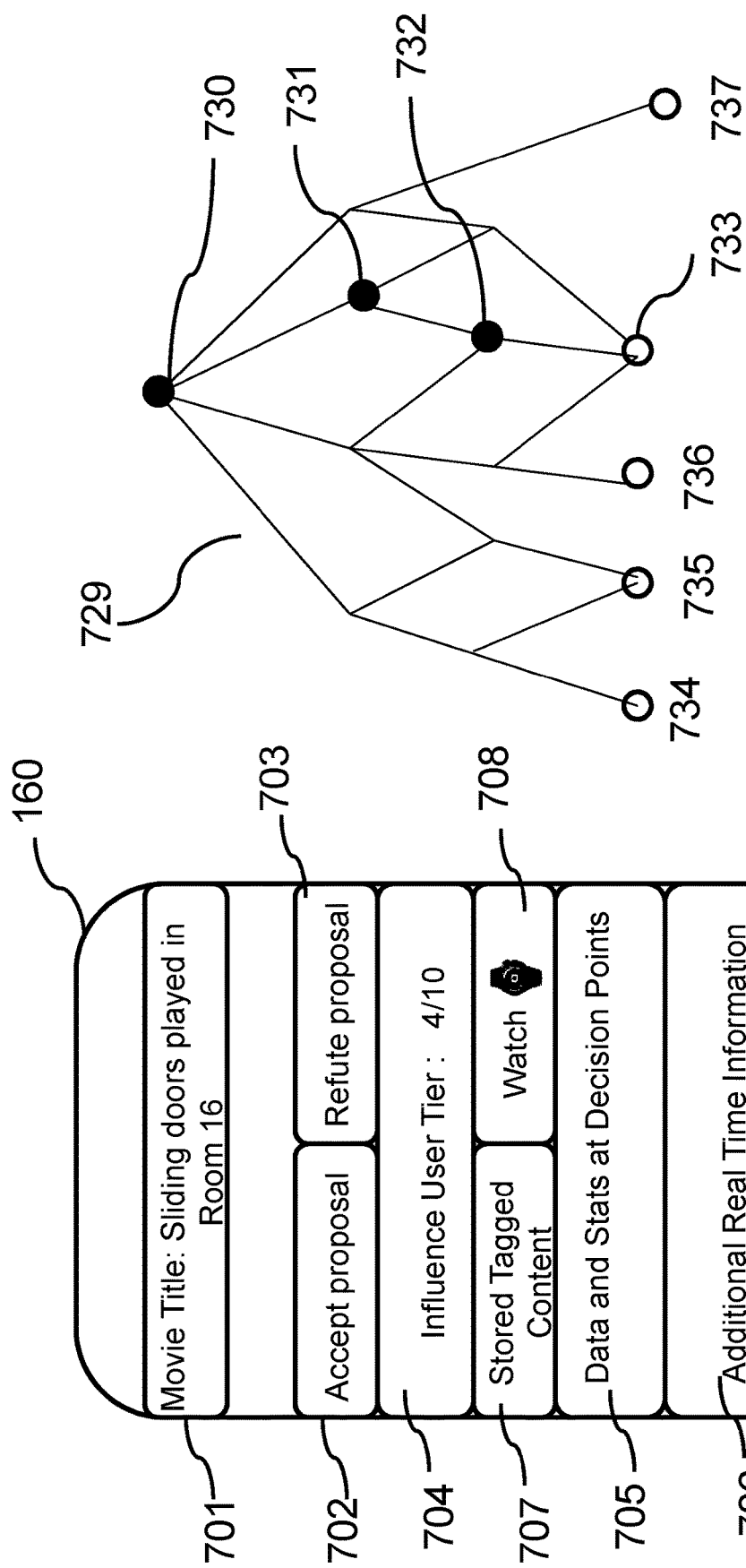
FIG. 7 provides an exemplary user interface in a UE adapted to enable user feedback and/or input to interactive digital work. Said user interface can be activated via a mobile application installed and running on said UE.

FIG. 7 represents one embodiment wherein shared digital entertainment can adapt and allow the enjoyment of different versions of the same family of digital works to both, first time and recurring users. It represents a schematic example of a user interface in a UE 161 or UE 160 that is adapted to provide feedback and input to an interactive shared digital work being played. Said user interface can be enabled by activating a mobile application installed on said UE.

Gamification uses an empathy-based approach for introducing, transforming and operating a service system that allows players to enter a gameful experience to support value creation for the players and other stakeholders. Interactive Shared Digital Works may provide such experience since users may be enticed to view the same family of digital works repeatedly to reach a higher influence user tier or unlock new scenarios.

In a possible exemplary embodiment, the invention may use Apple's iBeacon technology. An iBeacon represents a low-powered transmitter that utilizes Bluetooth low energy (BLE) proximity sensing. In a simplified form, an iBeacon transmitter performs the following functions: 1) communicate an ID code to a receiver apparatus and 2) provide means for said receiving apparatus to determine its distance from said iBeacon emitting source.

An iBeacon represents a Radio Emitting Object 160 that transmits a "Here I am" type of signal from its current location. Such "Here I am" signals can be transmitted outwardly from the iBeacon as far as only a few centimeters to more than 30 feet away. iBeacon signals are comprised of a Universally Unique Identifier (UUID), which is used to distinguish what application may "see" the iBeacon, as well as major and minor values. These major and minor values are placeholders for the developers to characterize—as they see fit—information about the iBeacons.

In one commercial example, the major values may identify a product type or service class and the minor values may identify specific products or services individually. For example, in a movie theater offering Interactive Shared Digital Works, a user may launch a mobile application contained in UE 160. Said mobile application may use the ID that UE 160 is receiving from an iBeacon station positioned within a theater's room to synchronize via Network Connection 145 with the digital work that is shown to the audience in said theater's room where UE 160 is positioned and the digital work is played.

As a result, a user may be given, at predetermined points during the showing of the digital work, the opportunity to express a preference via Network Connection 145 and collectively contribute to the unraveling of the plot in ways that may diverge and converge in ways similar to those represented in the movie "Sliding Doors", a 1998 British-American romantic drama. "Sliding Doors" alternates between two parallel universes based on the two paths the central character's life could take depending on whether or not she catches a train and causing different outcomes in her life.

As discussed, the left side of FIG. 7 represents a user interface that can be launched by a mobile application on a UE 160. Said mobile application can be synchronized with an Interactive Shared Digital Work shown, e.g., in a movie theater or at home via compatible equipment (Shared Ambiance Apparatus 120).

Window 701 may represent an information window showing the synchronized interactive shared digital work being played.

Variable Option Buttons 702 and 703 may represent an opportunity for inputs from a user when a certain node in the plot is reached. The text on display on these buttons may vary and the buttons may become active, e.g., at different points in time according to the plot.

The Influence User Tier Window 704 may show the class of influence of the user of UE 160 as compared to all the other users whose equipment is synchronized with said Interactive Shared Digital Work or as an absolute value.

Data and Stats at Decision Points Window 705 may show how the audience casts their vote when a certain node in the plot is reached.

Additional Real-Time Information 706 may provide information about the work that is synchronized with the Interactive Shared Digital Work on display. For example, it may provide captions for users who have auditory problems or need translations in different languages of the dialogues.

The right side of FIG. 7 shows a Plot Tree 729 for an Interactive Shared Digital Work. Root 730 represents the starting point of the digital work. Node 731 and Node 732 represent examples of collective decision point wherein the audience may cast their inputs. Nodes 731 and 732 represent points in time when Variable Option Buttons 702 and 703 may become active. The person skilled in the art will understand that Variable Option Buttons 702 and 703 could be more than two. In one implementation, every time two or more branches diverge a Node is formed and input from the audience can be requested.

Plot Tree 729 may contain a plurality of branches, diverging and converging, leading to Alternate Endings 734, 735, 736, 733, 737.

The person skilled in the art will understand that the inputs of users can be weighted according to many different schemes to maximize collective enjoyment, revenues, and promote a gamification effect. Users who repeatedly pay to watch a family of shared digital work may enjoy a preferential status.

In some implementations, shared digital works may only be adaptive rather than interactive. In this case, a digital work may not necessitate or solicit users' input. The digital work may adapt to promote collective enjoyment based on records of users' previous views of different versions of the digital work.

In certain implementations, a digital work, independently from its being interactive, or shared, or adaptive, may contain tagged objects. For example, a scene in a movie could contain items such as watches, bags, clothes, cars and in general objects or services that are worn or used by actors or are simply displayed during the representation of the digital work. The possibilities are numerous. Even hotels or services, e.g., can be tagged.

In certain implementations, since a mobile application can be synced with digital work, Tagged Items Window 708 may display tagged items that are shown or referred to at some stage in a temporal window while a digital work is been played.

In certain implementations, Tagged Items Window 708 may have the dual purpose of showing the tagged item and allowing the storing of information related to the item that is represented for later retrieval by a user in a cloud or in Memory 532. A user, via UE 160 may also press a button such as Temporal Window Button 707 that may allow the storing of tagged items within a temporal window in the region of the moment of the pressing of said Temporal Window Button 707.

The synchronization of the mobile application with the digital work can be achieved via one or more of the methods, alone or in combination, that will be discussed in the following paragraphs.

In one implementation, the buying of a ticket at a certain location and/or for certain digital work performance is enough information for the synchronizing of a mobile application running on UE 160. The system will have the information that is necessary for the synchronization since all the parameters that are needed are linked to the ID associated with the ticket and digital work. In one implementation, a wireless connection between UE 160 and a server associated with the digital work will ensure the synchronization of the mobile application and the data and functionalities associated with the selected time window related to the digital work.

In another implementation, the synchronizing can be derived from location data that is gathered by UE 160. When one or more audiovisual representations are associated to a location data the syncing can occur automatically or manually through a selection of possibilities that are presented to a user (e.g., in a multi-room movie theater).

In another implementation, the synchronizing can occur via a combination of factors, such as sampling of audio by UE 160 in combination with, e.g., a location-based data. The audio sampling can occur at predefined intervals to ensure continuous synchronizing once a first initial sync has occurred. The audio samples can be used to recognize and synchronize the mobile application with the audiovisual. The person skilled in the art will understand that since other data can be available to UE 160 or a server associated with UE 160, (such as a location data associated with one or digital works) the synchronization can be fast and efficient since the pool of possibilities for the needed sampling has been greatly reduced. The system will know, for example, that in a certain area only a limited number of digital works are performed.

In a possible implementation, the digital apparatus that is delivering the digital work can generate and associate a location datum to the digital work ID, so that nearby UE 160 can immediately narrow down the possibilities for the digital works that are playing nearby. The location datum, as previously discussed can be derived via many different techniques.

In another implementation, the synchronizing can be derived from the scanning of a QR code associated with a digital work performance. Said QR code can, for example, be located on a paper ticket associated with a digital work performance or be affixed at the place where said digital work performance is executed. In one implementation, the association of a location with a QR code, with a digital audiovisual representation is sufficient to initiate the synchronization.

Differently from an optical recognition system where tagged objects or scenes, must be recognized by an algorithm, a system that is based on synchronization with an audiovisual does not need to recognize any particular object or scene unless it is done by sampling portions of the digital audiovisual for the purpose of maintaining or initiating the syncing.

The tagging of objects can occur via a software program that will associate a particular timestamp with one or more tagged objects (including services or locations) that are displayed during or around said time stamp within the digital work.

After the user has acted upon Temporal Window Button 707 ambiance Tagged Items Window 708, a dataset associated with a user of UE 160 will contain data associated with a set of tagged items. These are represented in FIG. 3 at Tagged Items 380. In certain implementations, a user of UE 160 will be able to retrieve or act upon said tagged items. For example, a user will be able to browse commercial offers associated with said items or retrieve more information as needed for a future purchase.

In another implementation, an algorithm may signal to advertisement services or search engines, which items have been tagged and serve the associated user with information related to said items that are more conspicuous, as compared to other information. In one implementation, the tagged items can be associated with one or more locations so that associated user can be notified when he is in proximity to a store selling or displaying said tagged items that have been stored or marked by user. In another implementation, a user can be guided to said location.

Without in any way limiting the scope, interpretation, or application of the claims appearing below, a technical effect of one or more of the example embodiments disclosed herein can be the growth in popularity of RFID tags. Such ID tags may be contained, generated or transmitted by a portable apparatus such as a cellular phone, a tablet or can also be embedded in objects such as necklaces or bracelets or even implanted into a body.

Another technical effect of one or more of the example embodiments disclosed herein can be the creation of a new class of technical devices that have been named Shared Ambience Apparatuses 120 (SAA). It should be understood that under certain conditions, a traditional general-purpose computer, fixed or portable, could be adapted to function as an SAA 120. For example, said computer can be adapted to receive a stream of music from Service Server 100 that is the product of preferences located within Area 190. Users may check-in Area 190 by transmitting their ID to said computer via a WLAN or Bluetooth connection. Music boxes attached to said computer could provide the music to patrons.

Figure 8:
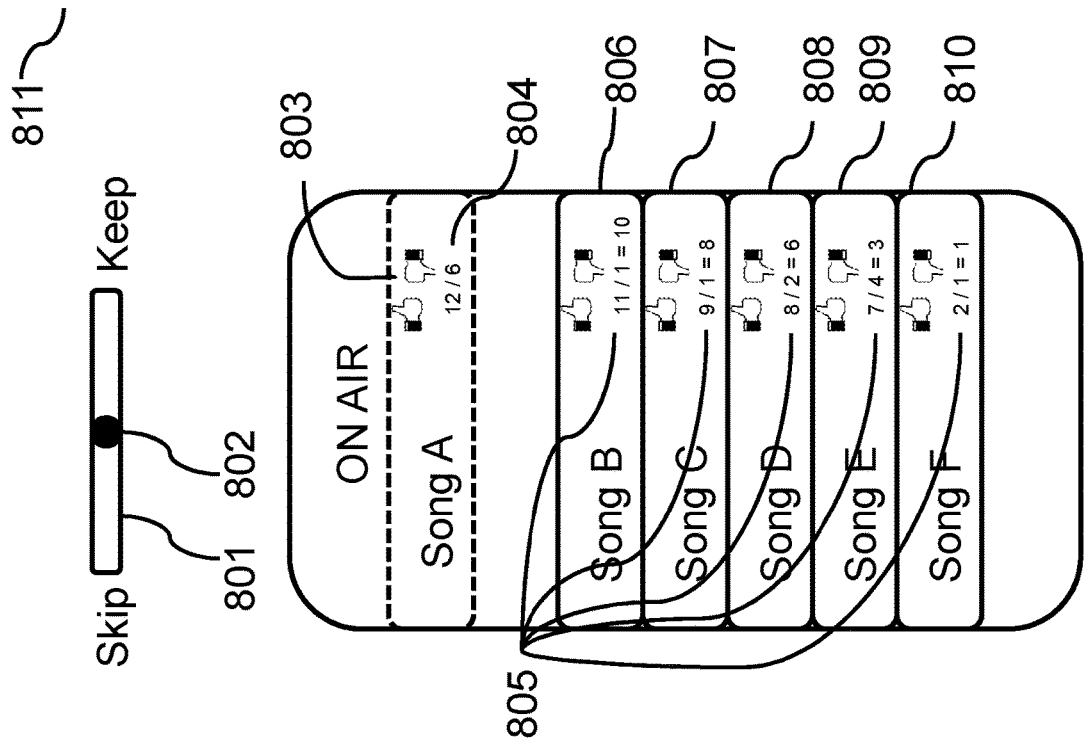
FIG. 8 provides an exemplary embodiment of a functionality pertaining to a mechanism to shorten or lengthen the playing time of digital works such as e.g., a song or a playlist of songs. It is understood that this is just an example and the same principle can be reapplied in other areas and/or digital works.

FIG. 8 represents a mechanism by which, for example, a playlist of songs that are scheduled to play in a common area may allocate more or less playing time to discrete songs that are on air. The person skilled in the art will understand that while FIG. 8 is explained with reference to songs and playlists of songs, many of the reasoning and observations described can be applied to various digital works.

In one implementation, users of UE 160 and UE 161 may provide negative or positive feedback to one digital work that is currently played within Area 190. In this example, Song 804 is on air. In one implementation every song in a playlist is allocated a predetermined budget of seconds, for example, 120 seconds. After 120 seconds of playing time the song automatically may fade or crossfade to the next song. In another implementation, digital songs in a playlist that is scheduled to play do not have a common budget of time. Every digital work (in this case a song) maintains its individual characteristic length. An algorithm can be implemented to cut short a digital song that is on air if a minimum number of Skips is reached (a threshold). In another implementation, the algorithm may consider a proportion between Keep and Skip received by the song while it is played. For example if the number of Skips is triple of the number of Keeps and the number of votes is at least N then the song played will be cut short or skipped. In FIG. 8, the song on air is Song 804. In one implementation, the algorithm could consider the number N_users of users that are associated with Area 190 or SAA 120. In this case, a keep/skip (or cut short) functionality may consider said number N_users of users who have voting right and add or detract seconds to the digital work when a subset of users (who belong to such number N_users) expresses a preference in way or another toward the song being played. In some implementations, a predetermined threshold ratio between "Keep" and "Skip" in Area 190 while a digital work is played as a proportion of the overall number N user associated to Area 190 may direct the system to keep or skip a song. The person skilled in the art will understand that the algorithm can be designed in an infinite number of ways to advance different purposes and scenarios.

One of the many algorithms is depicted in FIG. 8 as a mere matter of illustration.

The person skilled in the art will understand that the system described with reference to FIG. 8, may sometimes mimic a live disc jockey, (more commonly abbreviated as DJ). A DJ is a person who plays existing recorded music for a live audience. Most common types of DJs include radio DJ, club DJ who performs at a nightclub or music. Real person DJs often transition from one song to another song by overlapping the playing of these two songs (while the volume of the previous song goes down the volume of the next song goes up). This can be mimicked, e.g., by the system by providing an automatic crossfading functionality that can be tied to a real-time collection of feedback from users who are active in Area 190 about the song that is on air (Keep v. Skip). In other implementations, there is no crossfading functionality but a song will simply fade away while the next song will start when volume of the previous song reaches zero.

In certain implementations, the system provides visual indicia to users who are in Area 190 or are associated with SAA 120 or Area 190 to facilitate a gamification effect. For example, KEEP/SKIP BAR 801 may provide indicia of a real-time situation of a ratio for Keep/Skip for a song that is currently played. KEEP/SKIP BAR 801 may appear on a monitor placed in Area 190. It may also appear on UE 160 and UE 161 of users who are associated to said Area 190, said digital song, said playlist or said SAA 120.

KEEP/SKIP BAR 801 may contain an Indicator 802 (indicated as progressbar) that moves left or right according to an algorithm (for example Algorithm 811) that represents visually the inclination of the voting users toward keeping or skipping (or cutting short) a song that is played. KEEP/SKIP BAR 801 may turn red or green to indicate how close a song is to be cut short to incentivize voting and the gamification effect. The person skilled in the art will understand that KEEP/SKIP BAR 801 can be substituted with many other equivalent UX/UI solutions.

A playlist of songs can be arranged hierarchically according to users' submissions and users' voting before the actual song on top of the list is played. For example, with reference to FIG. 8, Song 806, Song 807, Song 808, Song 809 and Song 810 are arranged according to SUM LIKE DISLIKE 805. In this embodiment, songs are simply arranged according to the summation of positive votes and negative votes, where a Like counts a plus one and a Dislike counts a minus one. The song with the highest score may go on top of the list of upcoming songs to be played. In illustration of FIG. 8, Song 806 scores a 10, Song 807 scores an 8, Song 808 scores a 6, Song 809 scores a 3 and Song 810 scores a 1. The next song to be played will then be Song 806.

Once a song goes on air (e.g., is played in Area 190) (such as, e.g., Song 804 of FIG. 8), then SUM KEEP SKIP 803 summarizes data that can be used to lengthen or shorten the playing time for that song. In FIG. 8 Song 804 has received 12 Keep votes and 6 Skip votes while it is on air.

The person skilled in the art will understand that a great variety of algorithms and methods can be used to lengthen or shorten Song 804. As discussed, in some implementations a song can be allocated a fixed amount seconds. User feedback may add or detract to such fixed amount of seconds. In another embodiment, a song will play for its own individual length and can be cut short by real-time feedback of users (Keep or Skip when the song is played).

Algorithm 811 represented in FIG. 8 is just one embodiment among many others that are possible to cut short or lengthen a song that is on air. In this particular example, Algorithm 811 will compute a threshold by using the sum of the votes that the song received just before going on air. For example, for Song 806 the sum of likes and dislikes is 11+1=12 before going on air. Twelve (12) will become a baseline for exemplary Algorithm 811.

As a matter of illustration, Algorithm 811 will initiate the skipping of Song 806 (when Song 806 is on-air) if Controller 101 receives at least a number of Skip votes equal to 75% of the summation of the likes and dislikes that Song 806 has received just before going on air. In this example, Song 806 will be skipped (or shortened or phased out) when Controller 101 receives at least 9 skip requests when it is on air (75% of 12) and Number of Skips>Number of Keeps. Algorithm 811 aims at detecting the number of users who care to vote for a song (before it goes on air), independently from their positive or negative preference and uses such number as a baseline to initiate a skipping function when the song is on air. It should be apparent that similar thresholds can be used to influence the length of digital works in many different ways. In another example, a population of active users within Area 190 can be used to set a threshold.

In another example of Algorithm 811, in case of Song 803 that is on air, let's assume it had a sum of likes and dislikes equal to 16 (12 likes+4 dislikes) just before going on air. To be skipped or cut short while it is played, Song 803 will have to collect at least 12 Skips (75% of 16) and the number of Skips must be higher than number of Keeps that Controller 101 has so far received.

There are many other possibilities to set thresholds as the person skilled in the art of creating algorithms knows very well. Users may not have the same weights when they provide feedback and preferences. As discussed previously, some users who spend more time in Area 190 may reach a privileged status and may be able to influence Algorithm 811 more heavily than other users who are newcomers to Area 190. For example, if a user spends more than 20 hours within Area 190 per month he or she may acquire a premium user status and his or her Skip/Keep or Like/Dislike vote may count double (or triple) as compared to regular users. In another implementation, a premium status may be acquired by using more often the mobile applications installed on UE 160 and UE 161. In another implementation, a privileged status can be achieved by letting the system acquire more information about user of UE 160 (lowering privacy settings).

In another implementation, a premium status can be acquired by letting Controller 101 serve personalized advertisement to the user. In another embodiment, premium status can be acquired by advertising to other users the mobile application associated with the system. In another embodiment, a premium status can be acquired by becoming a recognized influencer within the mobile application. These are just nonlimiting examples as the person skilled in the art may recognize.

A user could have a privileged status only in one area, for example, Area 190 or could have a privileged status across multiple areas of the system.

In some implementations, User of UE 160, can retrieve indicia of what kind of digital works are performed in real-time or statistically in nearby areas even when user is outside the perimeter that allows him to influence the digital works being performed. For example, user of UE 160 can be prompted to join surrounding areas like Area 190 that Area fit his or her user profile that is stored on Memory 102. A user profile could be built via a neural network stored on Service Server 100. Such neural network could continuously adapt and modify the user profile by collecting information about user of UE 160 such as his or her Likes, Dislikes, Skips, Keeps, Areas and much more.

Areas could be dedicated to different genres and users could be prompted to join those areas that most closely fit their user profile. The teachings of the U.S. Pat. Nos. 9,894,476, and 9,286,610 of the same inventor as the present application are incorporated by reference in their entirety.

Embodiments of the present invention can be implemented in software, hardware, application logic or a combination of software, hardware and application logic. If desired, part or all of the software, application logic and/or hardware may reside on a Shared Ambience Apparatus 120 (SAA), on service Server 100, on Workstation 150 or on UE 161 and UE 160. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or devices, such as a computer or a server, with one example of a computer or server, described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions can be optional or can be combined. For example, the data structures in FIG. 3 or FIG. 6 can be simplified to contain only one or just a few data and settings that can be weighed against other data structures belonging to other users.

Although various aspects of the invention are set out in the independent claims, other aspects of the invention comprise other combinations of features from the described embodiments and/or the dependent claims with the features of the independent claims, and not solely the combinations explicitly set out in the claims.

"Plurality" shall mean one or more.

It is also noted herein that while the above describes example embodiments of the invention, these descriptions should not be viewed in a limiting sense. Rather, there are several variations and modifications that can be made without departing from the scope of the present invention as defined in the appended claims.

What is claimed is:

1. A method, comprising:
   receiving at least one user ID indicia associated to a user at a receiving apparatus from a wireless apparatus indicating presence of said user within a predetermined area;
   associating said at least one user ID indicia with a user data structure containing data pertaining to said user, wherein said user data structure, together with an operator data structure containing data pertaining to said predetermined area, facilitates the execution of predetermined functionalities;
   recording at least one of patterns data, explicit preferences data, and recurrences data related to said user;
   correlating said at least one of patterns data, explicit preferences data, and recurrences data related to said user with patterns data, explicit preferences data, and recurrences data related to a plurality of other users to deduct inferred preferences data related to said user;
   generating ambiance output associated to said predetermined area based at least in part on feedback data received from said wireless apparatus that is associated with said user ID indicia;
   generating synchronized indicia pertaining to said ambiance output at said wireless apparatus; and
   generating indicia pertaining to said inferred preferences data related to said user at said wireless apparatus when said wireless apparatus is detected within said predetermined area.

2. The method of claim 1, wherein different classes of users' data associated to said plurality of other users have predetermined weights for the determination of said inferred preference data related to said user.

3. The method of claim 1, wherein said synchronized indicia are captions that are synchronized with a digital audiovisual.

4. The method of claim 1, wherein said ambiance output associated to said predetermined area is a digital audiovisual exhibiting tagged objects and said synchronized indicia pertaining to said ambiance output are related to said tagged objects.

5. The method of claim 4, wherein indicia of said tagged objects are saved via said wireless apparatus.

6. The method of claim 1, wherein digital files that have been previously outputted as ambiance output when said wireless apparatus was detected within said predetermined area are precluded when said wireless apparatus is successively detected again within said predetermined area.

7. An apparatus, comprising:
   at least one processor; and at least one non-transitory computer-readable medium including computer program code;
   the at least one non-transitory computer-readable medium and the computer program code configured to, with the at least one processor, cause the apparatus to perform at least the following:
   facilitating the reception of at least one user ID indicia associated to a user at a receiving apparatus from a wireless apparatus indicating presence of said user within a predetermined area;
   associating said at least one user ID indicia with a user data structure containing data pertaining to said user, wherein said user data structure, together with an operator data structure containing data pertaining to said predetermined area, facilitates the execution of predetermined functionalities;
   recording at least one of patterns data, explicit preferences data, and recurrences data related to said user;
   correlating said at least one of patterns data, explicit preferences data, and recurrences data related to said user with patterns data, explicit preferences data, and recurrences data related to a plurality of other users to deduct inferred preferences data related to said user;
   generating ambiance output associated to said predetermined area based at least in part on feedback data received from said wireless apparatus that is associated with said user ID indicia;
   generating indicia pertaining to said inferred preferences data related to said user at said wireless apparatus, and generating synchronized indicia pertaining to said ambiance output at said wireless apparatus.

8. The apparatus of claim 7, wherein a window of opportunity for said feedback data that is received from said wireless apparatus associated with said user ID indicia is synchronized with said ambiance output.

9. The apparatus of claim 7, wherein said inferred preferences comprise a plurality of predetermined areas around said user's position.

10. The apparatus of claim 7, wherein said synchronized indicia pertaining to said ambiance output at said wireless apparatus are indicia of musical digital files.

11. The apparatus of claim 7, wherein said feedback data received from said wireless apparatus that is associated with said user ID regulates the ambiance output duration of a musical digital file.

12. The apparatus of claim 7, wherein said indicia pertaining to said inferred preferences data are commercial offers.

13. The apparatus of claim 7, wherein said recurrences data related to said user affect the timing of said ambiance output.

14. A computer software system having a set of instructions stored in a non-transitory computer-readable medium for controlling at least one general-purpose digital computer in performing desired functions comprising a set of instructions formed into each of a plurality of modules, each modules comprising:
   a process for receiving at least one user ID indicia associated to a user at a receiving apparatus from a wireless apparatus indicating presence of said user within a predetermined area;
   a process for associating said at least one user ID indicia with a user data structure containing data pertaining to said user, wherein said user data structure, together with an operator data structure containing data pertaining to said predetermined area, facilitates the execution of predetermined functionalities;
   a process for recording at least one of patterns data, explicit preferences data, and recurrences data related to said user;
   a process for generating ambiance output;
   a process for correlating said at least one of patterns data, explicit preferences data, and recurrences data related to said user with patterns data, explicit preferences data, and recurrences data related to a plurality of other users to deduct inferred preferences data related to said user;
   a process for generating synchronized indicia pertaining to said ambiance output at said wireless apparatus; and
   a process for generating indicia pertaining to said inferred preferences data related to said user at said wireless apparatus when said apparatus is detected within said predetermined area.

15. The computer software system of claim 14, wherein said synchronized indicia pertaining to said ambiance output are initiated by an optical scan.

16. The computer software system of claim 14, wherein said operator data structure includes settings resulting in said ambiance output adapting to a predetermined users' group data profile.

17. The computer software system of claim 14, wherein said synchronized indicia pertaining to said ambiance output at said wireless apparatus are interdependent traffic indications.

18. The computer software system of claim 14, wherein one of said predetermined functionalities is at least one of facilitating the purchasing a sponsored item, facilitating altering a playlist of digital items, facilitating altering the output sequence of segments at a node of an interactive shared digital work, facilitating altering the output duration of a digital file.

19. The computer software system of claim 14, wherein said one user ID indicia acquires more influence in determining said ambiance output depending on at least one of a number of data of check-ins within said predetermined area, a time duration data within said predetermined area.

20. The computer software system of claim 14, wherein said predetermined area is one of a plurality of predetermined areas and said wireless apparatus produces indicia related as to which predetermined areas are associated with an ambiance output that matches, at least in part, said user's profile that is contained in said user data structure.

\* \* \* \* \*